US012533691B2

(12) United States Patent
Hanson et al.

(10) Patent No.: US 12,533,691 B2
(45) Date of Patent: Jan. 27, 2026

(54) PNEUMATIC MATERIAL SPRAY GUN

(71) Applicant: PPG Architectural Finishes, Inc., Pittsburgh, PA (US)

(72) Inventors: Randal W. Hanson, Seven Fields, PA (US); Michael F. Takemura, Bellingham, WA (US); Christopher R. Hamlin, Seattle, WA (US); Robert G. Carrasca, Seattle, WA (US); Jeffrey R. Werring, Cheswick, PA (US); Kathryn R. Crabb, Vancouver, WA (US)

(73) Assignee: A-Paint Specialty, Inc., Cranberry Township, PA (US)

(*) Notice: Subject to any disclaimer, the term of this patent is extended or adjusted under 35 U.S.C. 154(b) by 217 days.

(21) Appl. No.: 16/958,970

(22) PCT Filed: Dec. 28, 2018

(86) PCT No.: PCT/US2018/067987
§ 371 (c)(1),
(2) Date: Jun. 29, 2020

(87) PCT Pub. No.: WO2019/133893
PCT Pub. Date: Jul. 4, 2019

(65) Prior Publication Data

US 2020/0338578 A1 Oct. 29, 2020

Related U.S. Application Data

(60) Provisional application No. 62/611,286, filed on Dec. 28, 2017.

(51) Int. Cl.
*B05B 7/12* (2006.01)
*B05B 7/04* (2006.01)
(Continued)

(52) U.S. Cl.
CPC .......... *B05B 7/1272* (2013.01); *B05B 7/0433* (2013.01); *B05B 7/065* (2013.01);
(Continued)

(58) Field of Classification Search
CPC ..... B05B 7/1272; B05B 7/0433; B05B 7/065; B05B 7/1245; B05B 7/241; B05B 7/2437; B05B 12/002
(Continued)

(56) References Cited

U.S. PATENT DOCUMENTS 4,174,068 A 11/1979 Rudolph
4,453,651 A 6/1984 Braithwaite et al.
(Continued)

FOREIGN PATENT DOCUMENTS

CN 1309231 A 8/2001
CN 2668274 Y 1/2005
(Continued)

OTHER PUBLICATIONS http://afisupply.com/shop/products/guns-and-parts/graco/fusion-mechanical-purge/ (Year: 2020).

*Primary Examiner* — Chee-Chong Lee
(74) *Attorney, Agent, or Firm* — Alan G. Towner; Leech Tishman Fuscaldo & Lampl

(57) ABSTRACT

Pneumatic spray guns (10) for applying sprayable materials (M) to various surfaces are disclosed. During use of the pneumatic spray guns (10), a tube (T) of flowable texture material (M) to be sprayed is loaded into a pressure canister (12) of the spray gun (10). Pressurized air is fed to the tube (T) of material (M) to be sprayed and is also fed to a spray nozzle region of the gun (10) to contact the material (M) after it has exited the tube (T) in order to provide a desired spray pattern (S). The pressure applied to the pressure
(Continued)

canister (12) and/or the pressure applied to the spray nozzle (20) may be varied in order to control the spray pattern (S).

21 Claims, 24 Drawing Sheets

(51) Int. Cl.
*B05B 7/06* (2006.01)
*B05B 7/24* (2006.01)
*B05B 12/00* (2018.01)

(52) U.S. Cl.
CPC ............ *B05B 7/1245* (2013.01); *B05B 7/241* (2013.01); *B05B 7/2437* (2013.01); *B05B 12/002* (2013.01)

(58) Field of Classification Search
USPC ................................................ 222/1; 239/322
See application file for complete search history.

(56) References Cited

U.S. PATENT DOCUMENTS

| | | | | |
|---|---|---|---|---|
| 4,948,054 | A | 8/1990 | Mills | |
| 4,951,876 | A | 8/1990 | Mills | |
| 5,429,307 | A | 7/1995 | Darroch | |
| 5,441,077 | A | 8/1995 | Smith et al. | |
| 5,536,531 | A * | 7/1996 | Owen | B05C 17/015 222/326 |
| 5,979,797 | A | 11/1999 | Castellano | |
| 6,095,435 | A * | 8/2000 | Greer, Jr. | B05C 17/01 239/329 |
| 6,112,945 | A | 9/2000 | Woods | |
| 6,161,778 | A * | 12/2000 | Haruch | B05B 7/0892 239/419 |
| 6,299,686 | B1 | 10/2001 | Mills | |
| 6,382,474 | B1 | 5/2002 | Woods et al. | |
| 6,612,506 | B1 | 9/2003 | Huang | |
| 6,712,238 | B1 | 3/2004 | Mills | |
| 7,163,130 | B2 * | 1/2007 | Lafond | B05C 17/00503 222/326 |
| 8,028,934 | B2 * | 10/2011 | Wurz | B05B 7/0458 239/419 |
| D888,890 | S | 6/2020 | Hamlin | |
| D891,582 | S | 7/2020 | Hamlin et al. | |
| 11,027,295 | B2 | 6/2021 | Gunn | |
| 2019/0076861 | A1 | 3/2019 | Gunn | |
| 2022/0176392 | A1 | 6/2022 | Hanson et al. | |

FOREIGN PATENT DOCUMENTS

| | | | |
|---|---|---|---|
| CN | 201431950 | Y | 3/2010 |
| CN | 201661742 | U | 12/2010 |
| CN | 202447223 | U | 9/2012 |
| CN | 106944321 | A | 7/2017 |
| DE | 2606008 | A1 | 8/1977 |
| DE | 9011965 | U1 | 11/1990 |
| DE | 202014010567 | | 12/2015 |
| EP | 0380792 | A2 | 8/1990 |
| EP | 0525562 | A1 | 2/1993 |
| EP | 0548509 | A1 | 6/1993 |
| EP | 2221115 | | 8/2010 |
| FR | 1209697 | A | 3/1960 |
| RU | 2678034 | C2 | 1/2019 |

* cited by examiner

PNEUMATIC MATERIAL SPRAY GUN

CROSS-REFERENCE TO RELATED APPLICATION

This application claims priority from U.S. Provisional Patent Application No. 62/611,286, filed Dec. 28, 2017, which is incorporated herein by reference.

FIELD OF THE INVENTION

The present invention relates to devices for spraying materials, and more particularly relates to pneumatic spray guns that can be used to spray materials such as textured drywall coatings and texture paints.

BACKGROUND

Texture materials such as drywall and texture paints are typically applied to surfaces using aerosol spray cans, hopper guns and hopper rigs. However, aerosol cans have limited areas of coverage, and hopper guns and rigs have limitations.

SUMMARY OF THE INVENTION

An aspect of the present invention is to provide a pneumatic spray gun for spraying texture material. The spray gun comprises a pressure canister having an interior volume structured and arranged to receive a tube of the texture material; a nozzle assembly adjacent to a front end of the pressure canister comprising a spray nozzle structured and arranged to discharge the texture material therethrough, and an air nozzle structured and arranged to direct pressurized air toward the texture material as it passes through the spray nozzle; a valve assembly structured and arranged to selectively direct first pressurized air through the air nozzle, and to selectively direct second pressurized air to the interior volume of the pressure canister to force the texture material from the tube toward the spray nozzle for contact with the first pressurized air; and a trigger engaged with the valve assembly to actuate the valve assembly to thereby control flow of the first pressurized air to the air nozzle or to control flow of the second pressurized air to the interior volume of the pressure canister.

Another aspect of the present invention is to provide a method of operating a pneumatic spray gun as described above. The method includes loading a tube of flowable texture material into a pneumatic spray gun and moving the trigger of the pneumatic spray gun from a closed position toward an open position to thereby initiate flow of the first pressurized air followed by flow of the second pressurized air after an initial delay time.

These and other aspects of the present invention will be more apparent from the following description.

DETAILED DESCRIPTION

Figure 1:
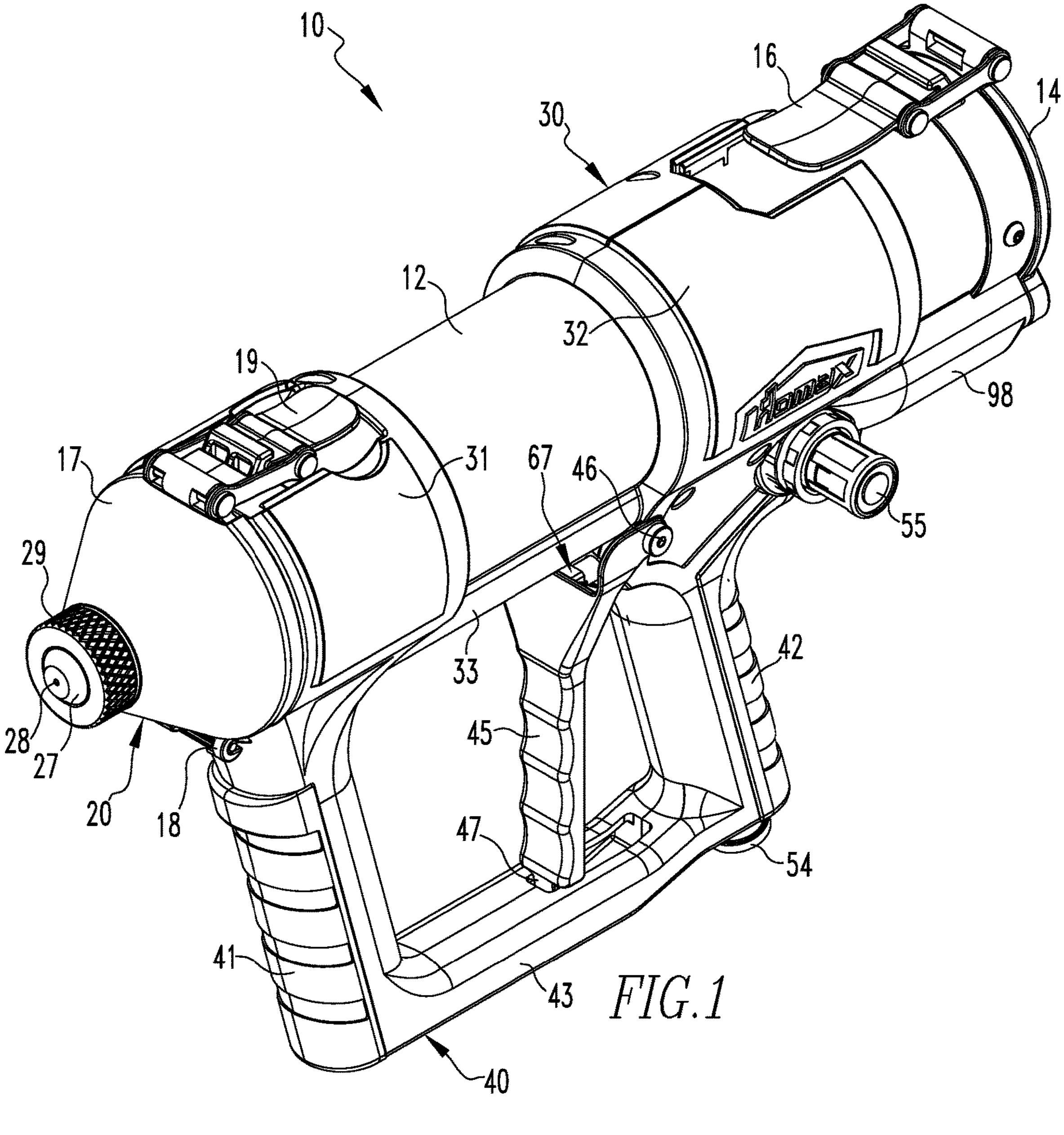
FIG. 1 is a front isometric view of a pneumatic spray gun in accordance with an embodiment of the present invention.
Figure 2:
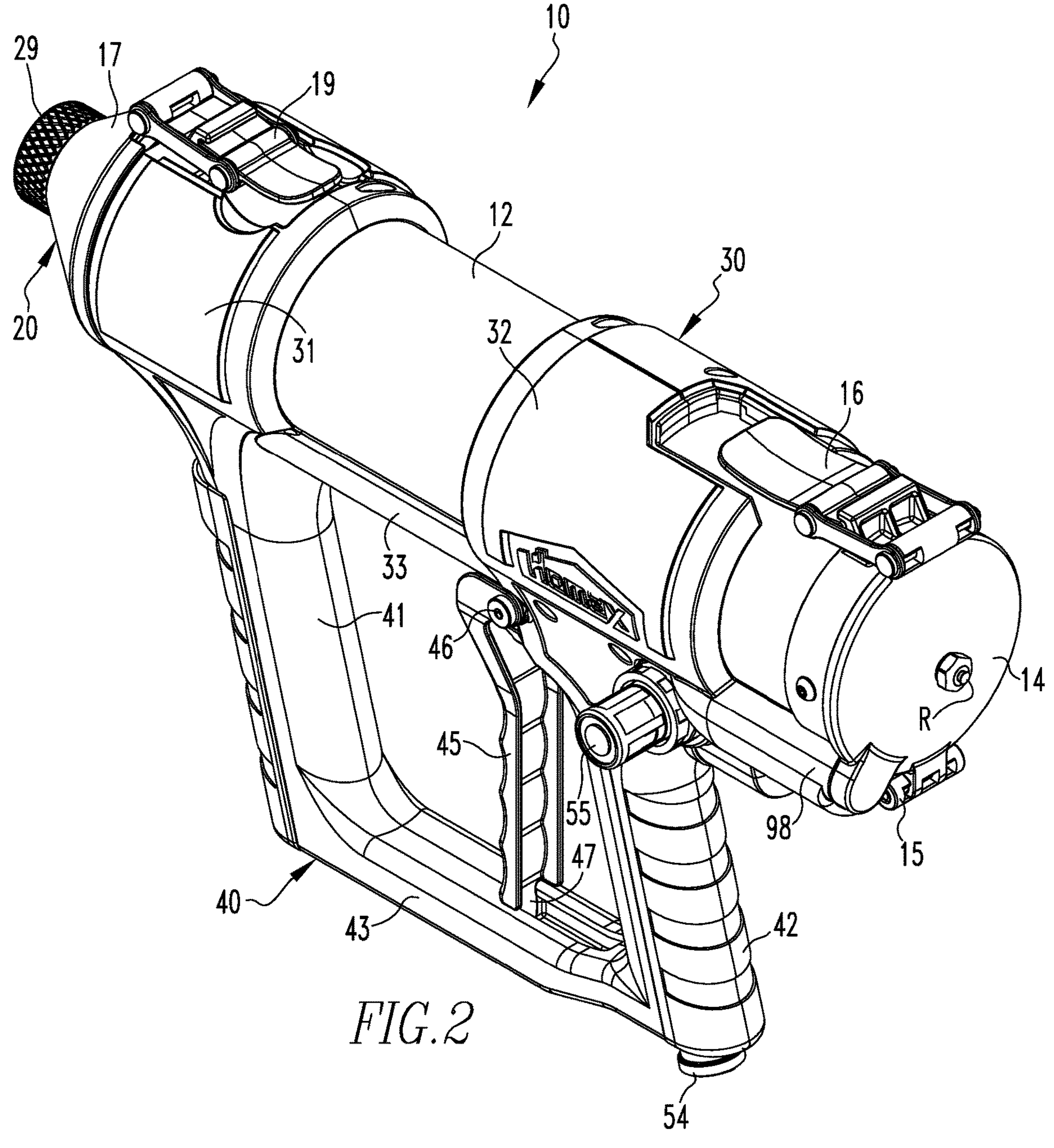
FIG. 2 is a rear isometric view of a pneumatic spray gun in accordance with an embodiment of the present invention.
Figure 3:
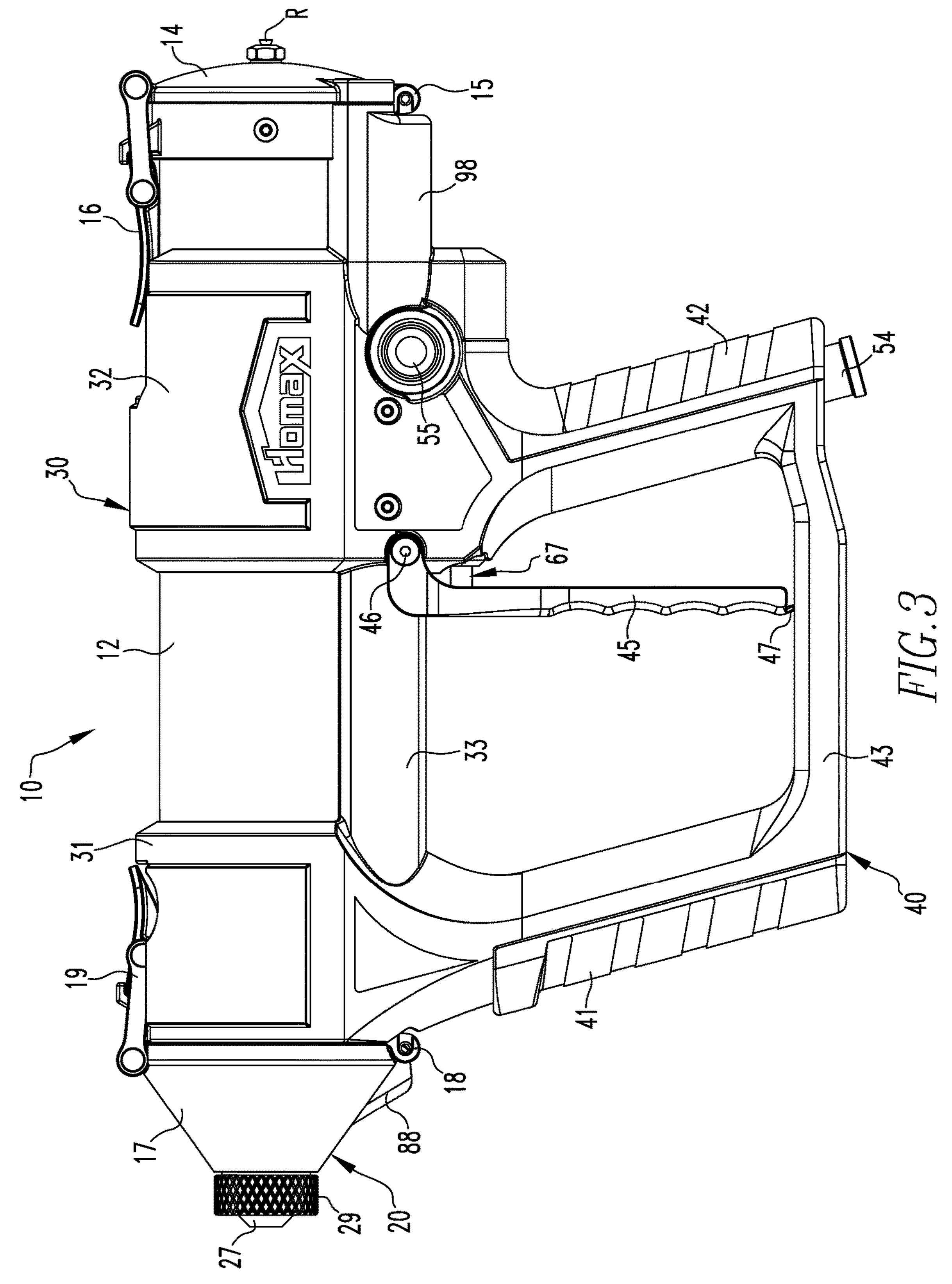
FIGS. 3 and 4 are left-side and right-side views of a pneumatic spray gun in accordance with an embodiment of the present invention.
Figure 4:
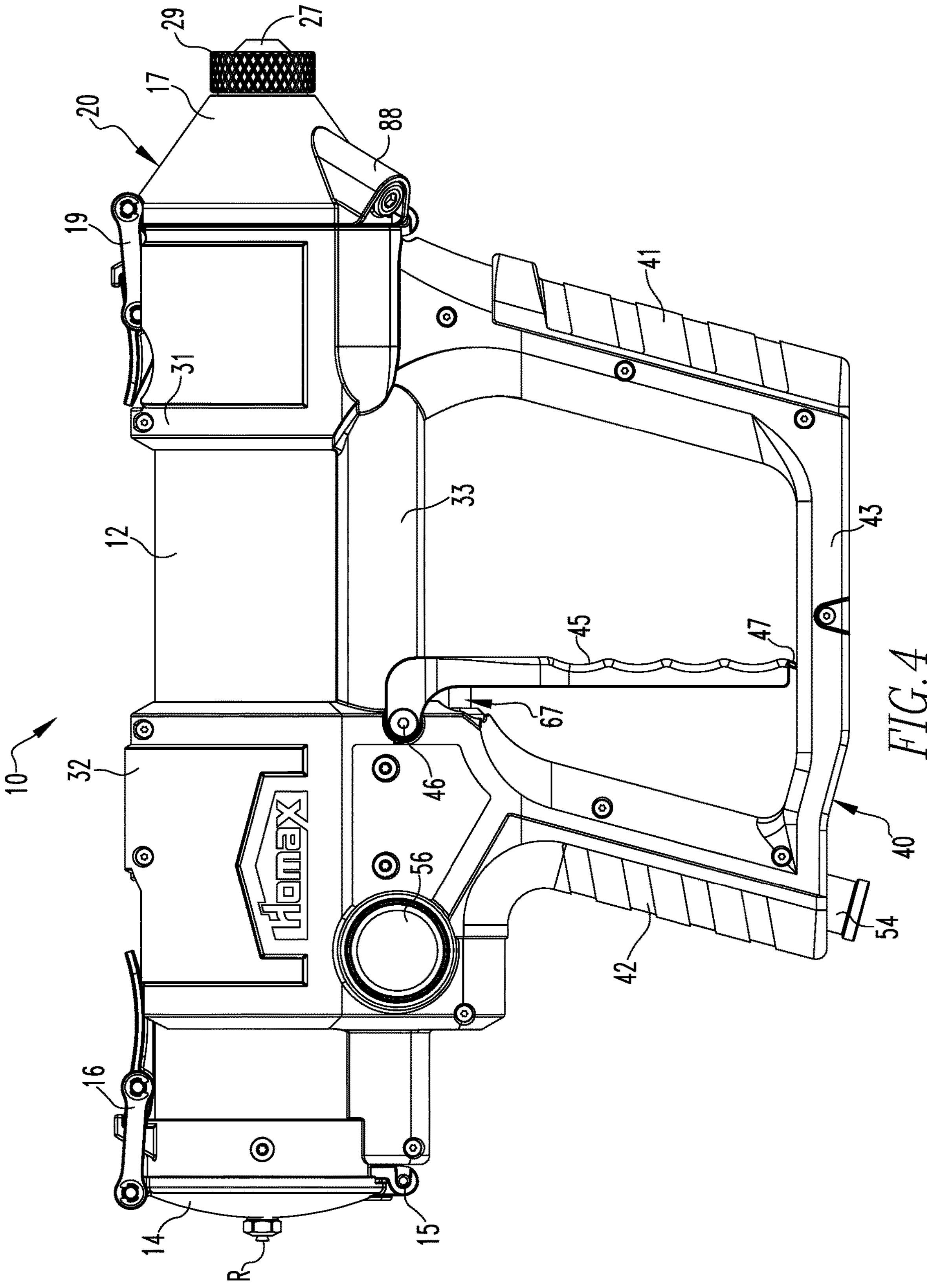
Figure 5:
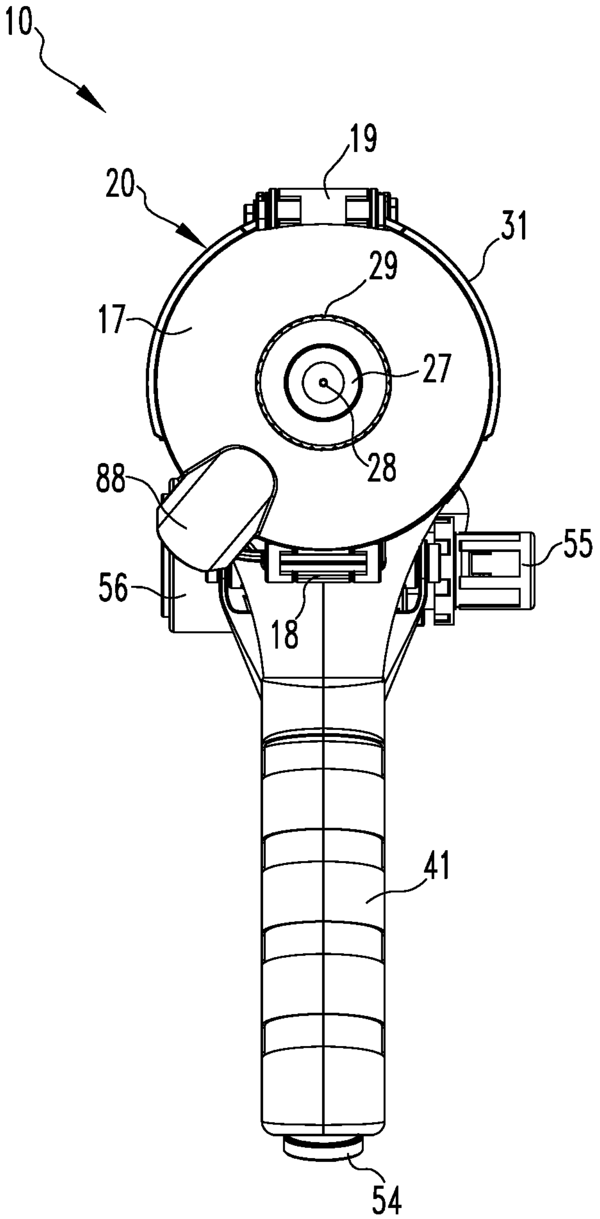
FIGS. 5 and 6 are front and rear views of a pneumatic spray gun in accordance with an embodiment of the present invention.
Figure 6:
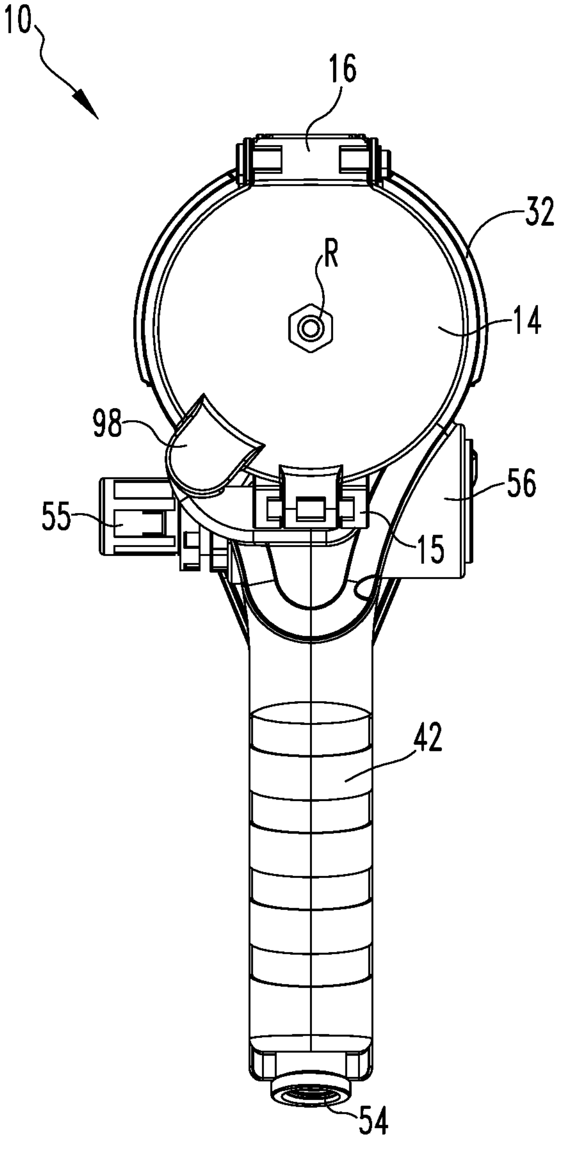
Figure 7:
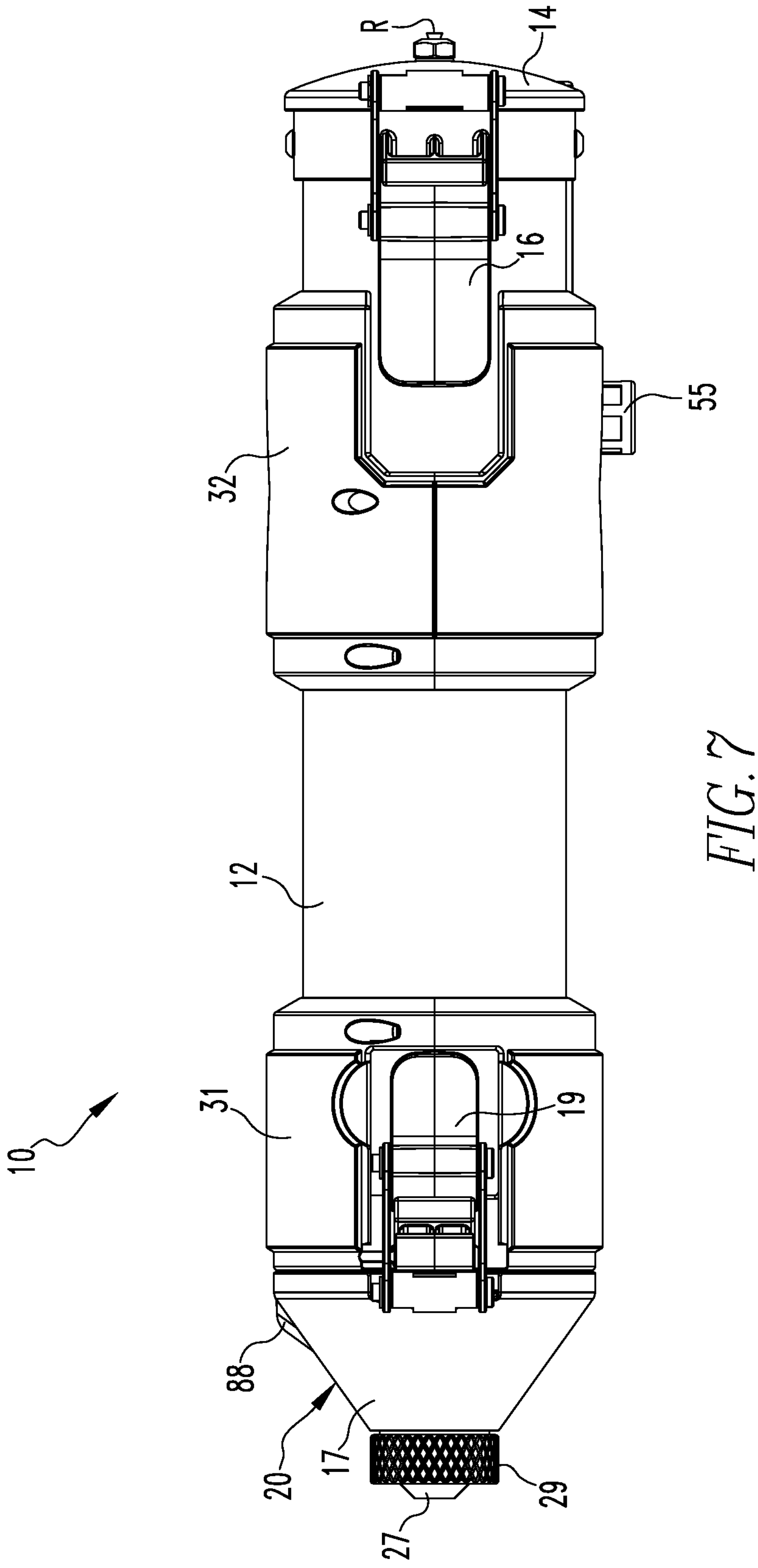
FIGS. 7 and 8 are top and bottom views of a pneumatic spray gun in accordance with an embodiment of the present invention.
Figure 8:
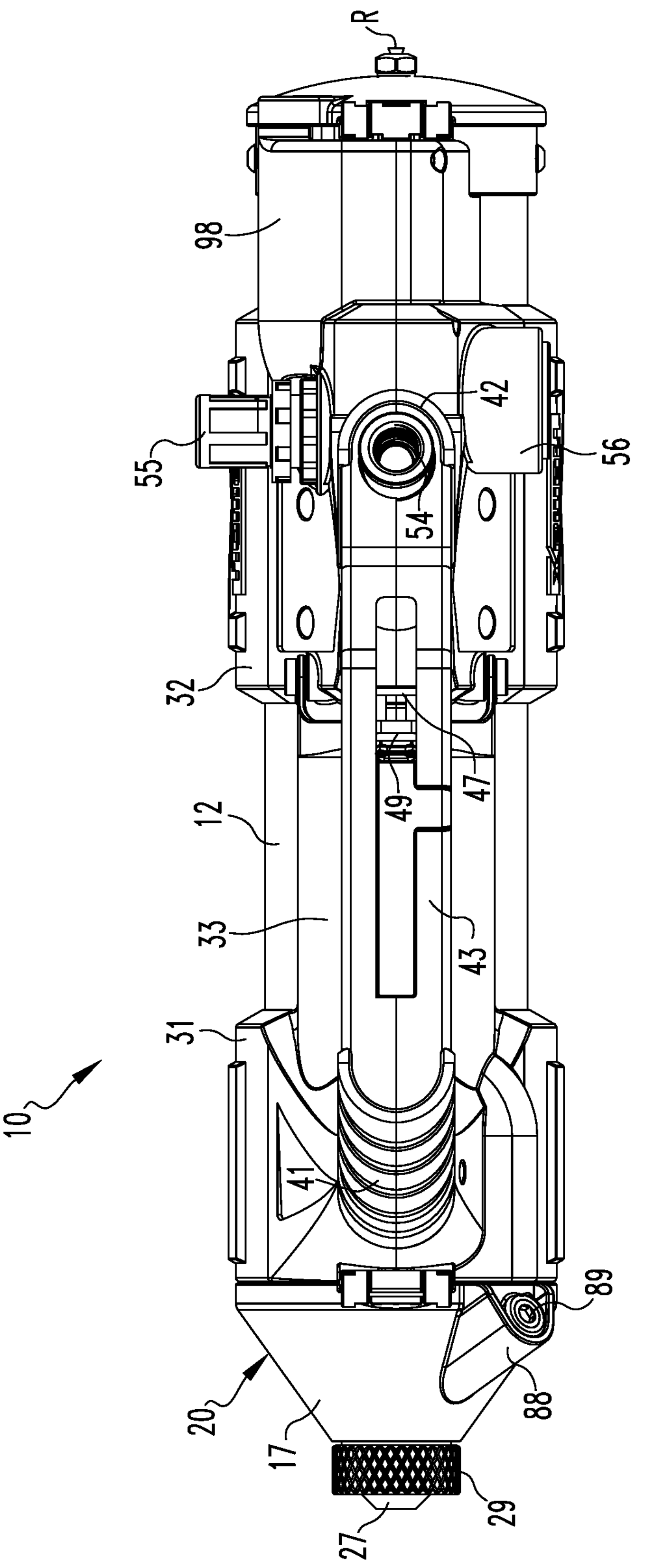

Pneumatic spray guns of the present invention may be used to spray materials such as textured drywall and texture paints onto surfaces in various textured patterns. Examples of drywall textures include orange peel, splatter, knockdown and acoustic "popcorn" textures. Examples of paint textures include premium 100 percent acrylic paints capable of producing splatter and knockdown textures, but durable so they do not require top coating with a separate coat of paint. Other materials that may be sprayed using the pneumatic spray guns of the present invention include elastomeric stucco coatings, insulation coatings, sound deadening coatings, automotive/truck bedliner coatings, adhesives and the like.

FIGS. 1-19 illustrate a pneumatic spray gun 10 and components thereof in accordance with an embodiment of the present invention. The pneumatic spray gun 10 includes a generally cylindrical pressure cannister 12 with an interior volume 13. A rear hatch assembly 14 is sealingly attached at the rear end of the pressure cannister 12 by a rear pivot mounting 15. A rear closure latch 16 secures the rear hatch assembly 14 in a closed and sealed position on the rear of the pressure cannister 12. A front nose cap assembly 17 is sealingly attached at the front end of the pressure cannister 12 by a front pivot mounting 18. A front closure latch 19 secures the front nose cap assembly 17 in a closed and sealed position on the front of the pressure cannister 12. As more fully described below, the pressure canister 12 may contain a tube T of flowable material M such as liquid drywall formulations, paint texture formulations, liquid adhesive coatings such as fiberglass reinforced plastic adhesives, tile adhesives and flooring adhesives, and slurries such as stucco formulations. During spraying operations, such flowable material M within the pressure canister 12 is subjected to elevated pressures to force the texture material M from the tube T, where it is contacted by a flow of pressurized air to generate a desired texture material spray pattern.

Figure 10:
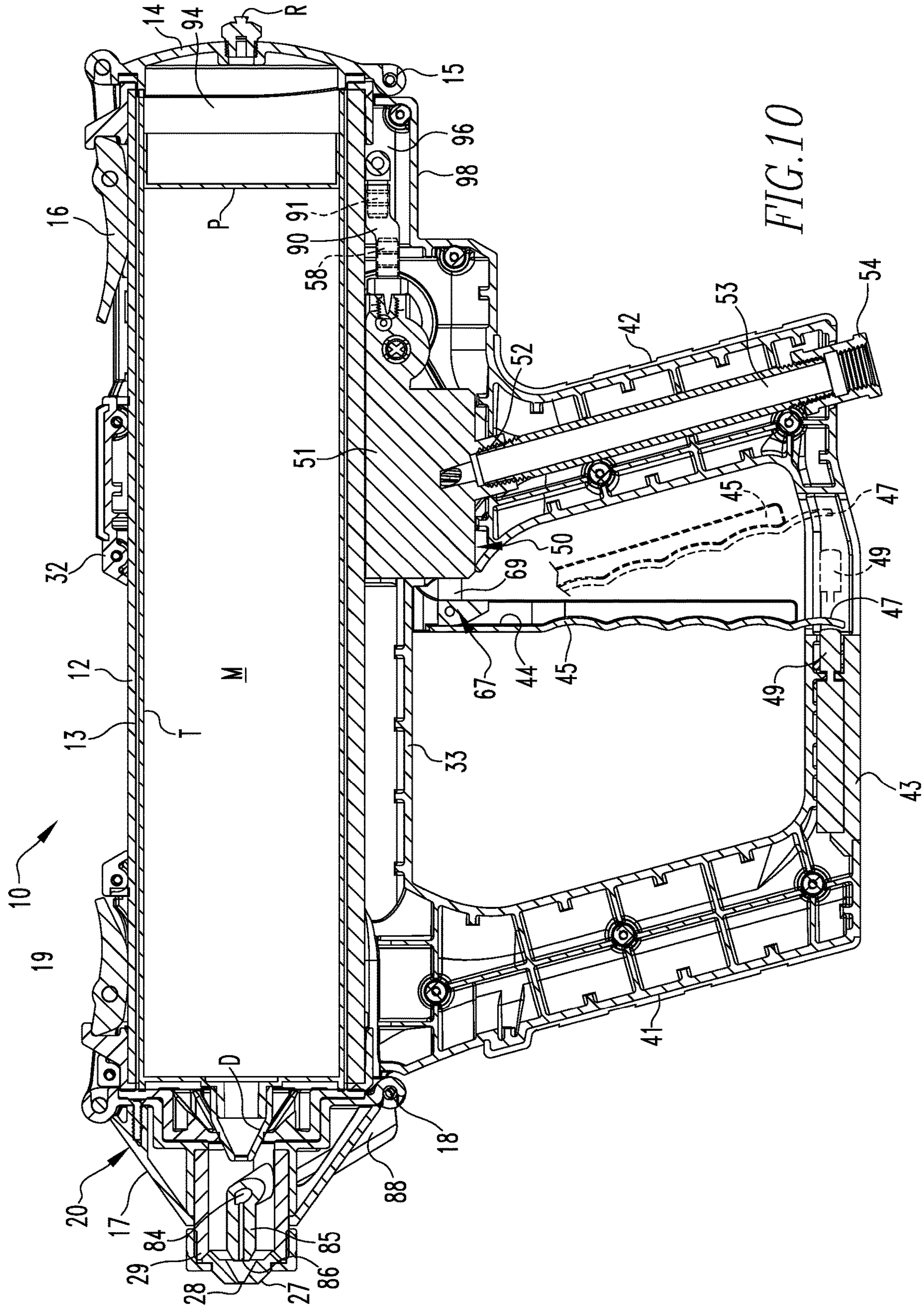
FIG. 10 is a side sectional view of a pneumatic spray gun in accordance with an embodiment of the present invention.
Figure 11:
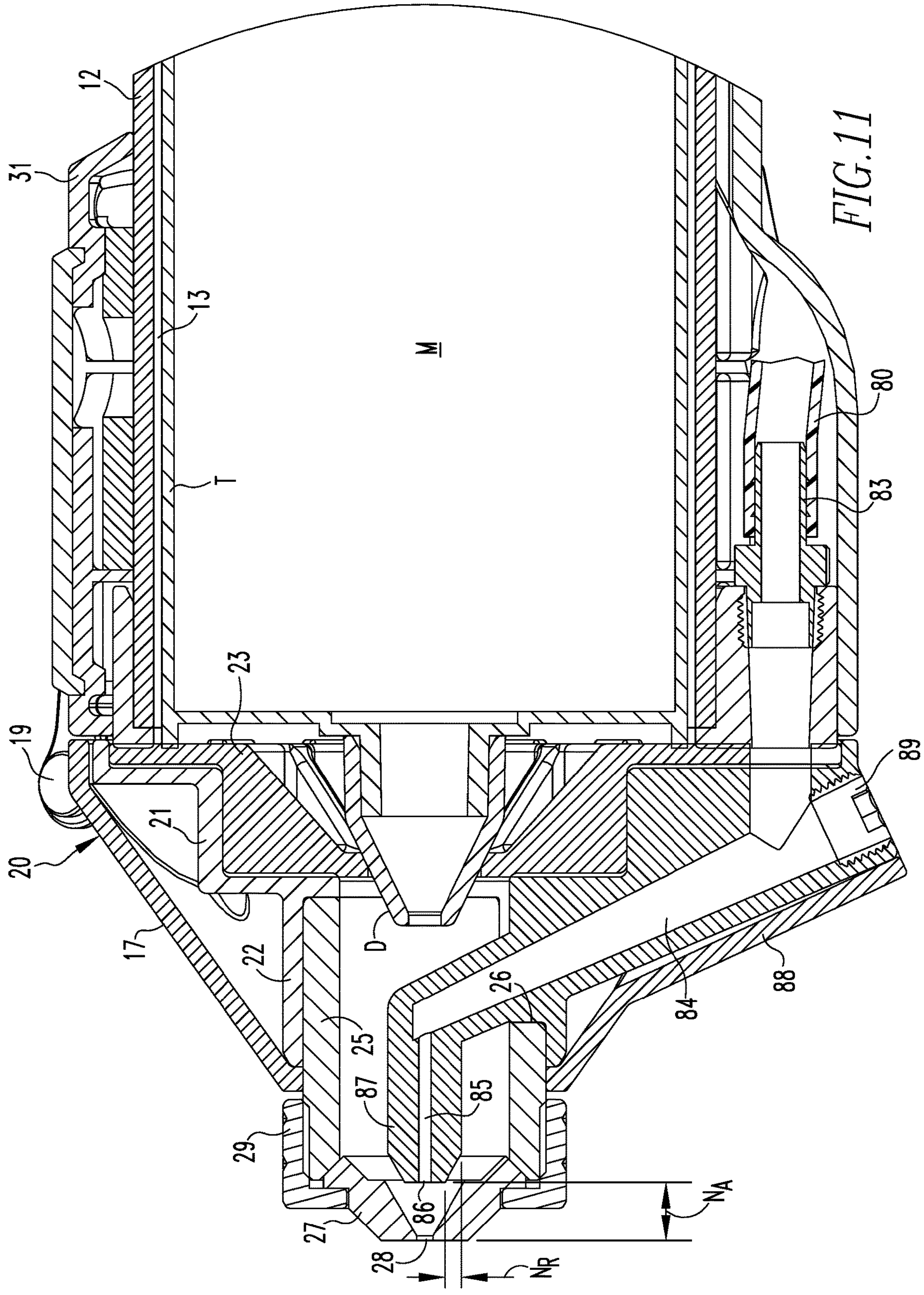
FIG. 11 is a magnified view of a portion of the side sectional view of FIG. 10.
Figure 12:
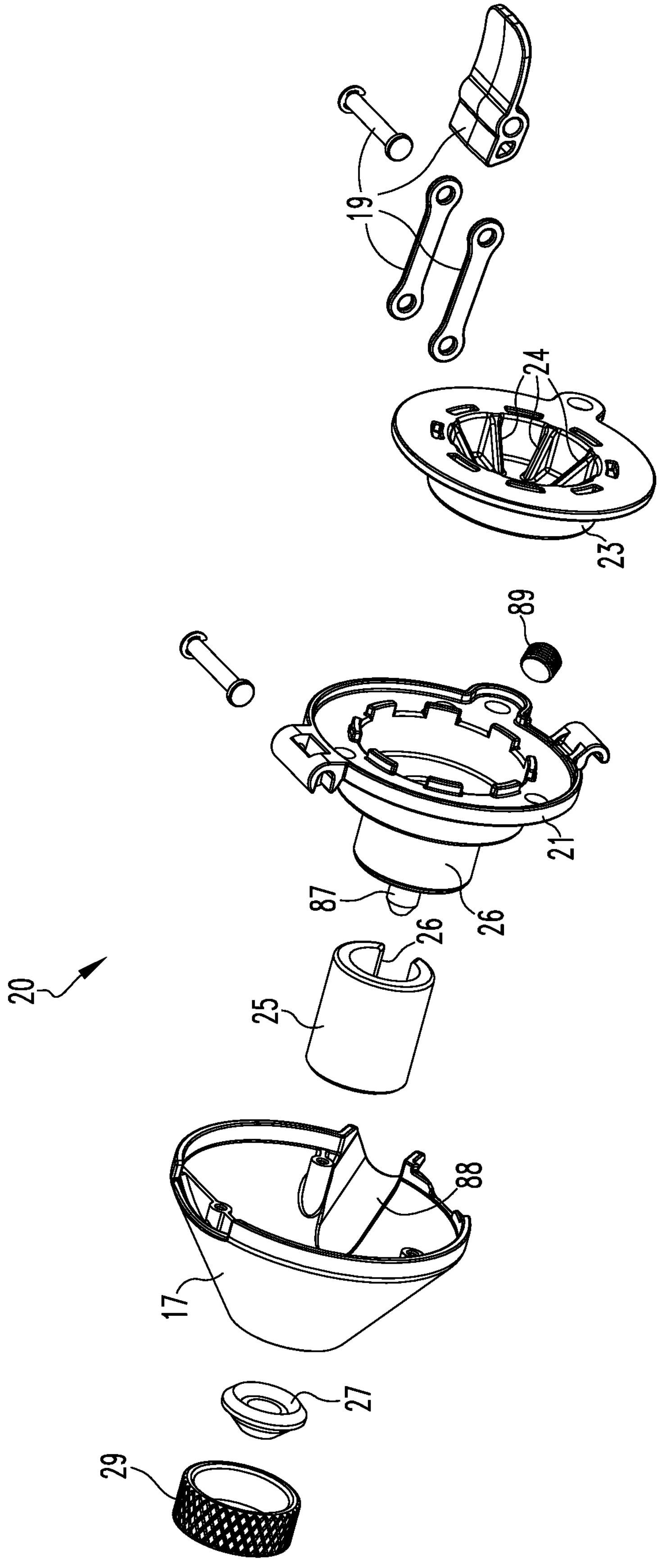
FIG. 12 is an exploded isometric view of a nozzle assembly for use in a pneumatic spray gun in accordance with an embodiment of the present invention.

As shown most clearly in FIGS. 10 and 11, the tube T containing texture material M is inserted in the pressure cannister body 12. The tube T has an open rear end fitted with a moveable plunger P which is friction fit into the rear tube opening, thereby containing the material from flowing out the rear of the tube. A dispensing tip D is provided at the front of the tube T. When pressurized air is delivered into the interior volume 13 of the pressure canister 12, it forces the plunger P forward, causing the texture material M to flow out of the dispensing tip D of the tube T into the nozzle assembly 20, where it merges with a flow of pressurized air to produce a desired texture spray pattern, as more fully described below.

As shown most clearly in FIGS. 1 and 10-12, the pneumatic spray gun 10 includes a nozzle assembly 20 having a front cap housing 21 with a front annular wall 22 that forms a front cylindrical recess. A gasket 23 having support ribs 24 is installed in the front cap housing 21 to form an airtight seal between the front cap housing 21 and the front end of the pressure canister 12 when the front nose cap 17 is in its closed position. A cylindrical sleeve 25 having a slot 26 is installed in the cylindrical recess of the front annular wall 22 of the front cap housing 21. A nozzle insert 27 is removably seated on the front end of the cylindrical sleeve 25, and is held on the sleeve 25 by a nozzle retainer 29.

Figure 13:
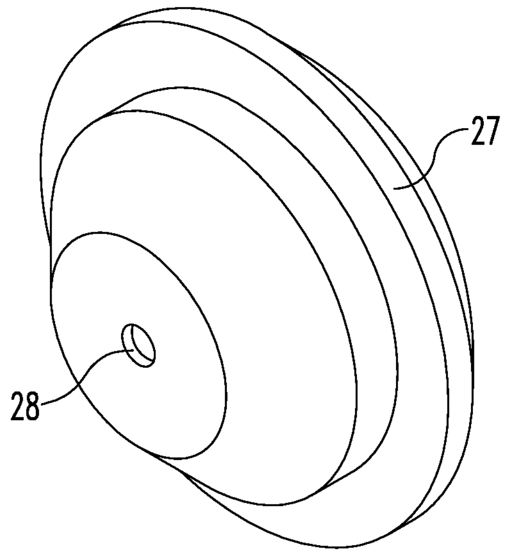
FIGS. 13 and 14 are isometric views of nozzle inserts having different sizes of outlet openings in accordance with embodiments of the present invention.
Figure 14:
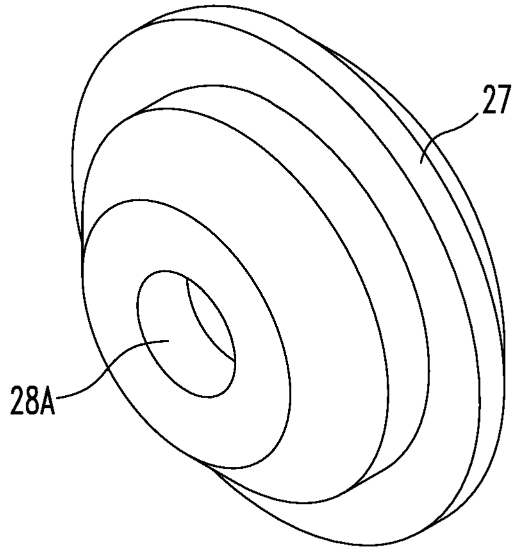
Figure 15:
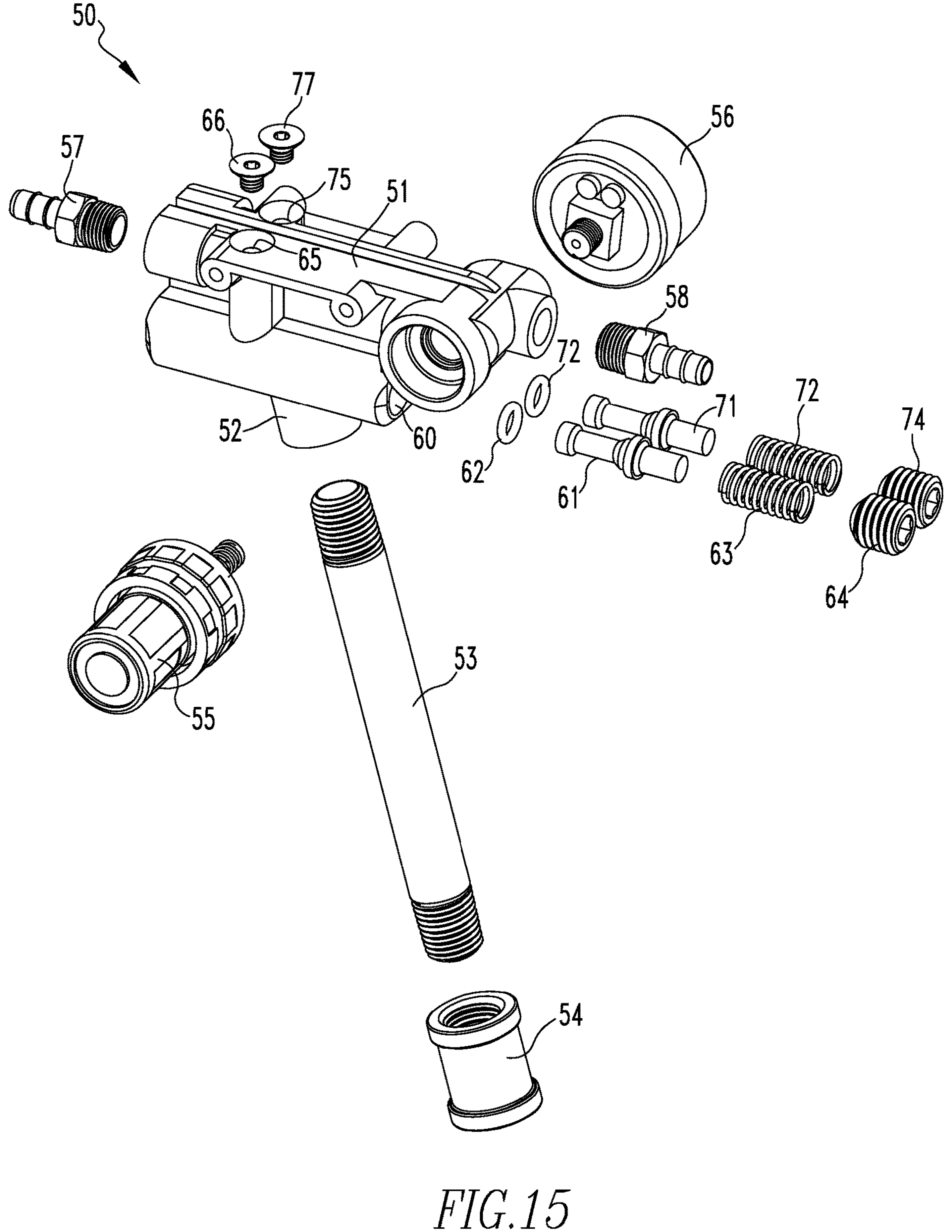
FIG. 15 is an exploded isometric view of a valve assembly for use in a pneumatic spray gun in accordance with an embodiment of the present invention.
Figure 16:
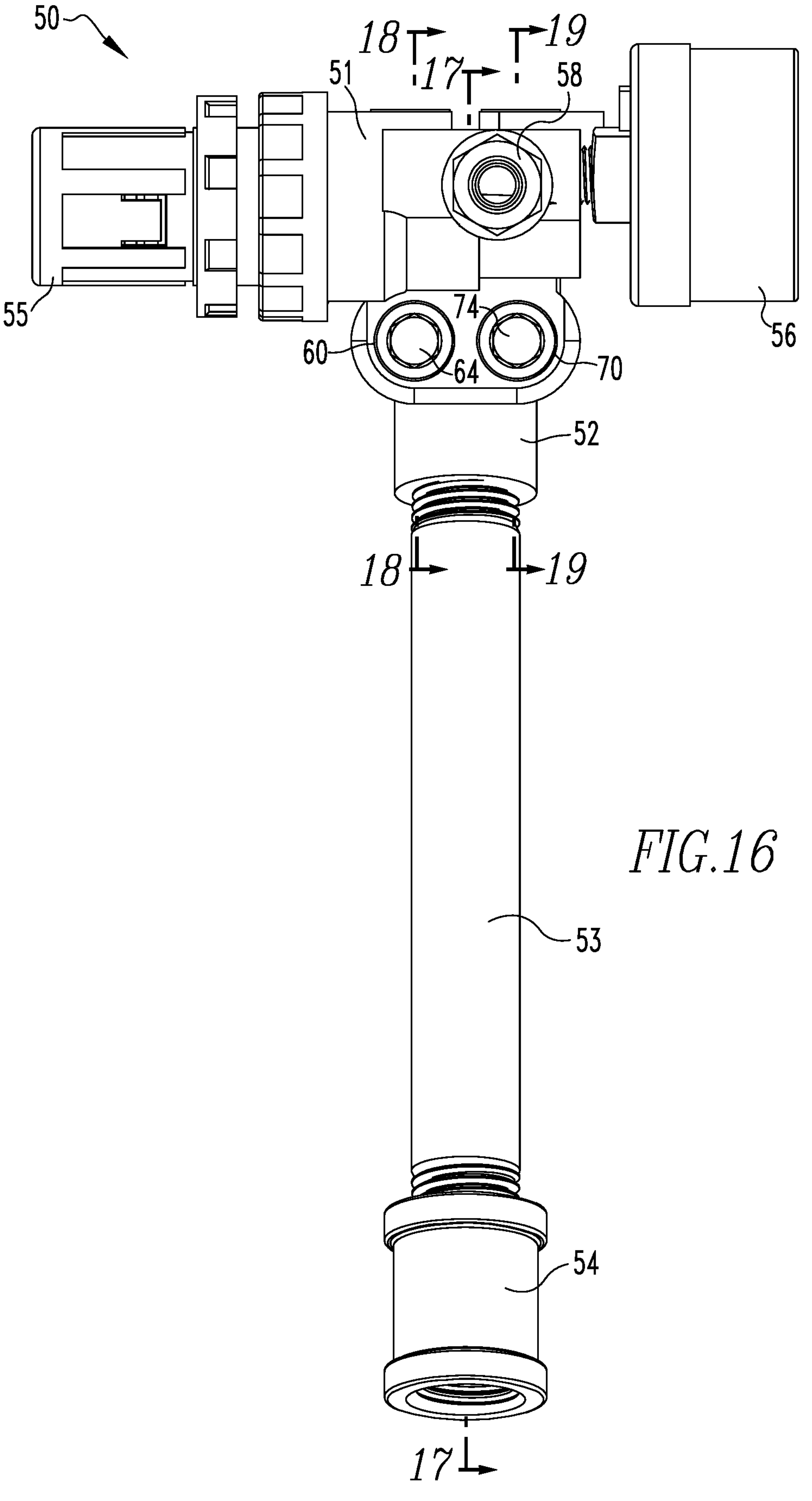
FIG. 16 is a rear view of a valve assembly for use in a pneumatic spray gun in accordance with an embodiment of the present invention.
Figure 17:
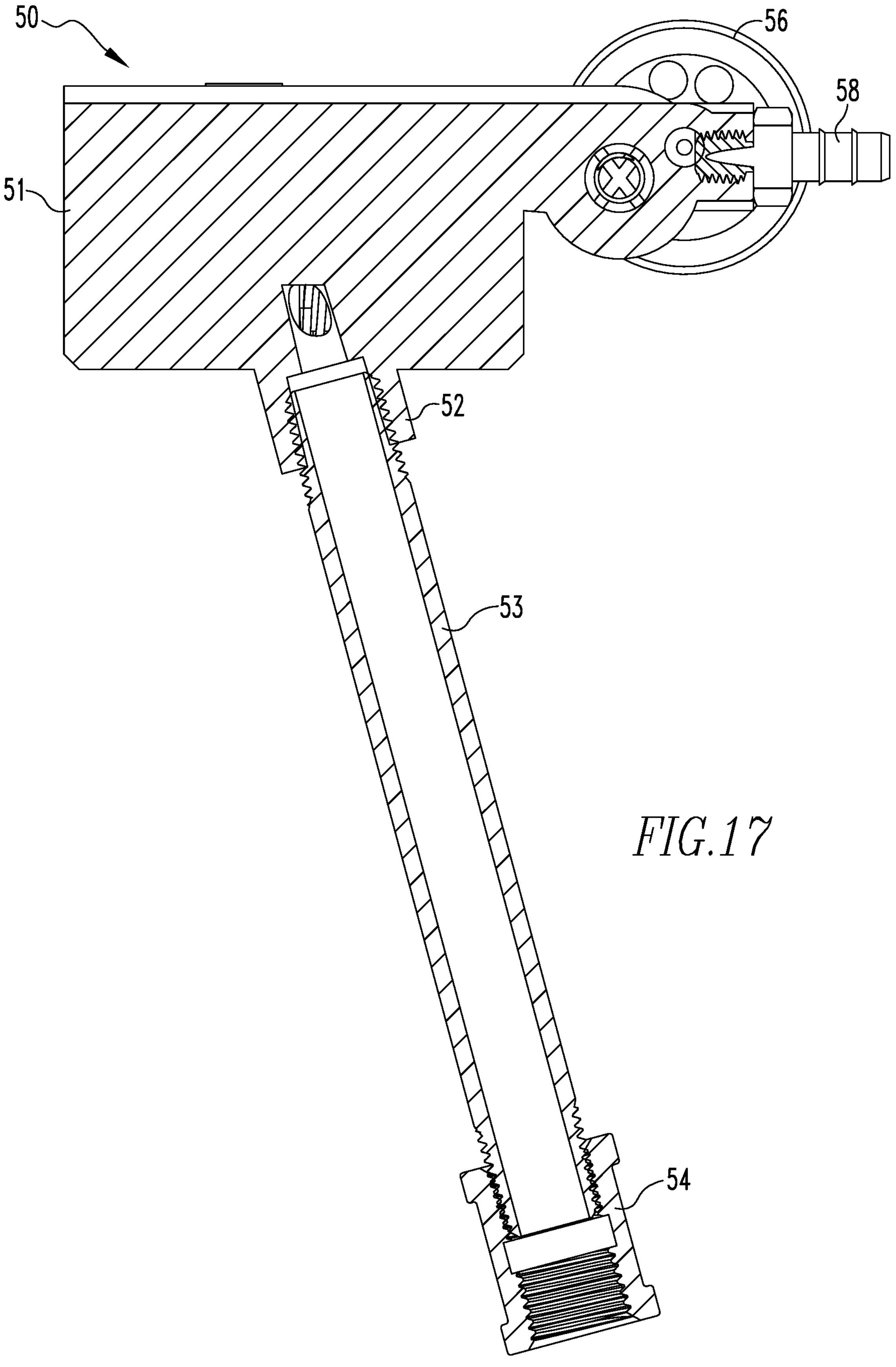
FIG. 17 is a side sectional view taken through section 17-17 of FIG. 16.

As shown in FIGS. 13 and 14, the nozzle insert 27 may have a nozzle hole 28 of relatively small diameter (FIG. 13) or may have a nozzle hole 28A of relatively large diameter (FIG. 14). For example, the diameters of the nozzle holes may range from 1 to 8 mm, or from 2 to 6 mm. Any suitable number of nozzle inserts 27 having varying nozzle hole sizes may be used.

Figure 9:
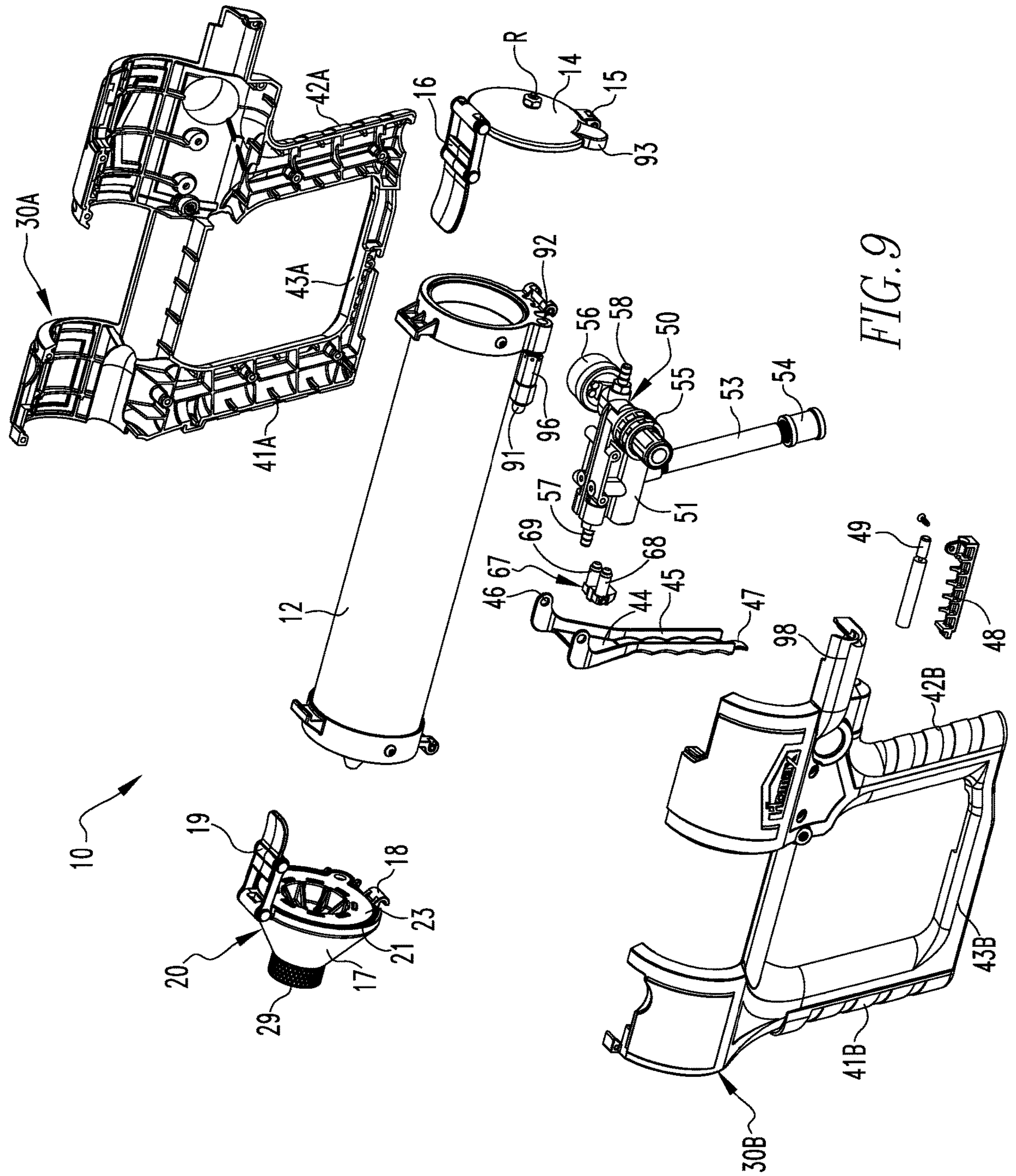
FIG. 9 is an exploded isometric view of a pneumatic spray gun in accordance with an embodiment of the present invention.

As shown most clearly in FIG. 9, the pneumatic spray gun 10 includes a housing assembly 30 having a right-side subassembly 30A and a left-side subassembly 30B. When the right-side and left-side subassemblies 30A and 30B are secured together to form the housing assembly 30, a front housing sleeve 31 is provided at the front end of the pressure cannister 12, and a rear housing sleeve 32 is provided at the rear end of the pressure cannister 12. The housing 30 includes a lower spine 33 extending between the front and rear housing sleeves 31 and 32 below the pressure cannister 12.

The pneumatic spray gun 10 includes a trigger handle assembly 40 including a front handle 41, rear handle 42, and bridge 43 connecting the front and rear handles 41 and 42. A trigger 45 is pivotably mounted by a trigger pivot mounting 46 onto the housing 30. A trigger tip 47 is provided at the lower end of the trigger 45. The trigger 45 includes a contact surface 44 that engages a valve actuator assembly 67, as more fully described below. A damper bracket 48 is secured inside the bridge 43, and a damper cylinder and piston assembly 49 is mounted on the damper bracket 48. When the trigger 45 is in a resting or closed position as shown in the Figures, the trigger tip 47 contacts the piston of the damper assembly 49. As more fully described below, contact between the damper cylinder and piston assembly 49 and the trigger tip 47 dampens the movement of the trigger 45 when a user releases the trigger 45 and the trigger moves from its open position to its closed position.

As shown most clearly in FIGS. 9 and 15-19, the pneumatic spray gun 10 includes a valve assembly 50 having a valve body 51. Pressurized air may flow into the valve assembly 50 by means of an air inlet sleeve 52, air inlet tube 53, and air inlet fixture 54. A regulator 55 is provided on one side of the valve body 51, and a pressure gauge 56 is provided on the other side of valve body 51. A first pressurized air outlet 57 extends from the front of the valve body 51, and a second pressurized air outlet 58 extends from the rear of the valve body 51. As more fully described below, the first pressurized air outlet 57 feeds a first stream of pressurized air to the front nozzle assembly 20, where it impinges upon the texture material M as it flows from the dispensing tip D to provide a desired spray pattern. The second pressurized air outlet 58, which is in flow communication with the regulator 55 in the embodiment shown, feeds a second supply of pressurized air to the interior volume 13 of the pressure canister 12, where it forces the plunger P forward in the tube T to thereby discharge the texture material M through the dispensing tip D at the front end of the tube T.

As shown most clearly in FIGS. 16-19, the valve assembly 50 includes a first valve cylinder 60 inside the valve body 51, a first valve plunger 61, a first O-ring 62, a first biasing spring 63, and a first plug screw 64. The valve assembly 50 also includes a second valve cylinder 70 inside the valve body 51, a second valve plunger 71, a second O-ring 72, a second biasing spring 73, and a second plug screw 74.

As shown in FIGS. 3-5, 9, 10, 18 and 19, a valve actuator assembly 67 is located between the contact surface 44 of the trigger 45 and the valve body 51 of the valve assembly 50. The valve actuator assembly 67 includes a first actuator plunger 68 and a second actuator plunger 69. As shown most clearly in FIG. 18, the first actuator plunger 68 of the valve actuator assembly 67 is inserted into the first valve cylinder 60 of the valve assembly 50, where it contacts the first valve plunger 61. The first biasing spring 63 forces the first valve plunger 61 against the first actuator plunger 68. Movement of the first actuator plunger 68 into the first valve cylinder 60 upon squeezing or opening of the trigger 45 and its contact surface 44 moves the first valve plunger 61 into the first valve cylinder 60 against the bias force of the first biasing spring 63 to thereby open the flow of air from the air inlet sleeve 52 into a first pressurized air passage 65. The first pressurized air passage 65 is in flow communication with the first pressurized air outlet 57. A first access screw 66 permits access to the first pressurized air passage 65.

Figure 19:
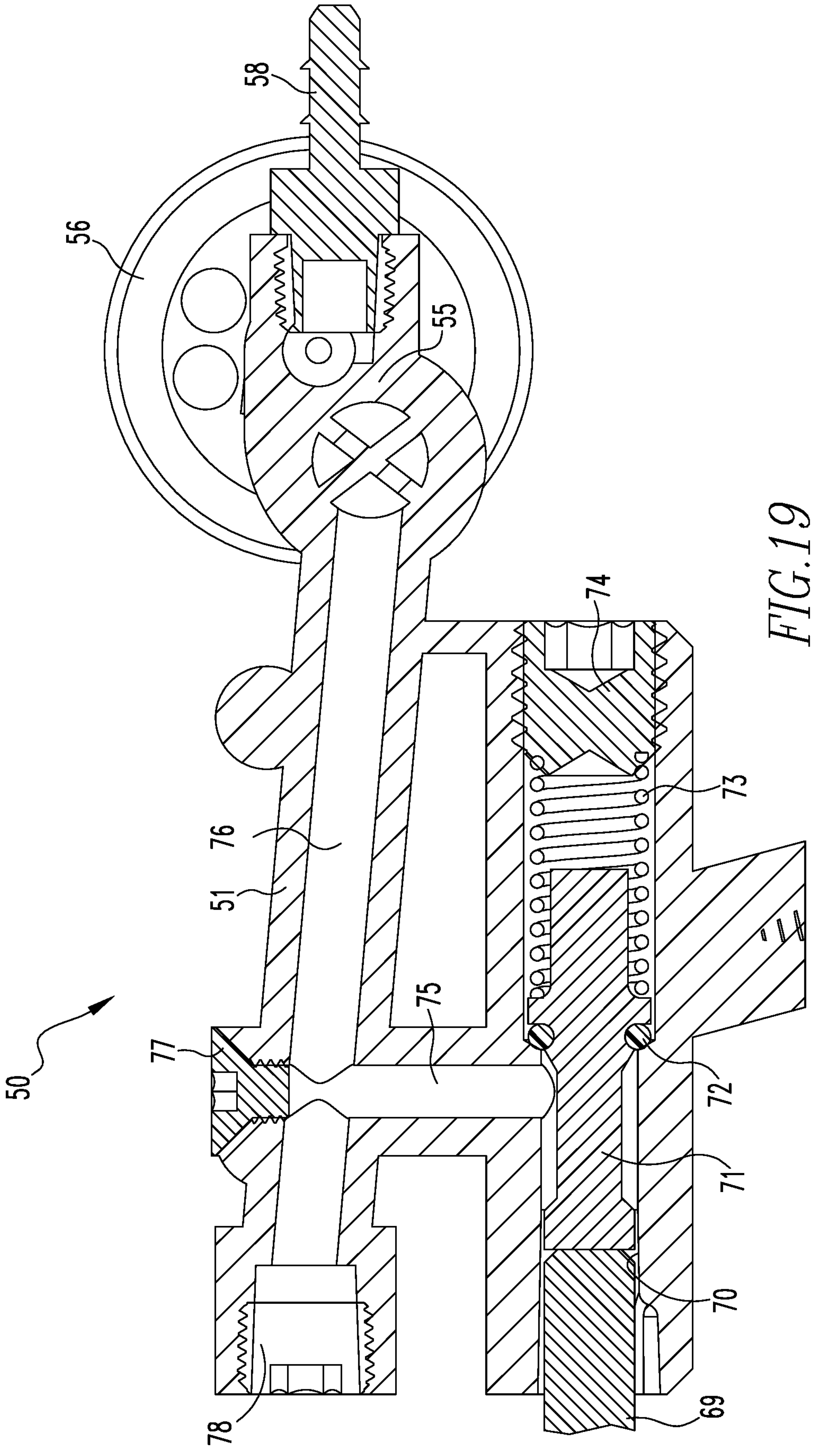
FIG. 19 is a side sectional view taken through section 19-19 of FIG. 16.

As shown in FIG. 19, the second actuator plunger 69 of the valve actuator assembly 67 is inserted into the second valve cylinder 70 of the valve assembly 50. The second biasing spring 73 forces the second valve plunger 71 against the second actuator plunger 69. Movement of the second actuator plunger 69 into the second valve cylinder 70 upon opening of the trigger 45 and its contact surface 44 causes the second valve plunger 71 to move into the second valve cylinder 70 against the bias force of the second biasing spring 73 to thereby open the flow of pressurized air from the air inlet sleeve 52 into a second pressurized air passage 75. As shown in FIG. 9, the axial length of the second actuator plunger 69 may be shorter than the axial length of the first actuator plunger 68 in order to initiate the flow of the first pressurized air to the nozzle assembly 20 before the flow of the second pressurized air to the interior volume 13 of the pressure canister 12. The different lengths of the first and second plungers 68 and 69 also stop the flow of the second pressurized air prior to stopping the flow of the first pressurized air when a user releases the trigger 45 and it returns toward its closed position. The second pressurized air passage 75 has a branch 76 that is in flow communication with the pressure regulator 55. The second pressurized air outlet 58 is downstream from the pressure regulator 55 and delivers the regulated second pressure to the interior volume 13 of the pressure canister 12, as more fully described below. A second access screw 77 permits access to the second pressurized air passage 75. An access plug 78 provides access to the rear branch 76.

As shown in FIG. 10, a second pressurized air delivery line 90 extends between the second pressurized air outlet 58 of the valve assembly to an inlet fixture 91 of a commercially available quick exhaust valve 96. As shown in the exploded view of FIG. 9, the quick exhaust valve 96 includes an outlet port 92 in flow communication with an air passage cavity 93 that extends radially outward from the rear hatch assembly 14. The air passage cavity 93 allows the second pressurized air to flow from the second pressurized air outlet 58 through the quick exhaust valve 96 into the rear portion 94 of the interior volume 13 of the pressure canister 12. As further shown in FIGS. 9 and 10, the pressure relief valve R in the rear hatch assembly 14 may be used to limit the amount of pressure inside the pressurized canister and may be set to any desired pressure level such as 60 psi, 80 psi, 100 psi or the like.

The quick exhaust valve 96 may quickly exhaust pressure from the interior volume 13 of the pressure canister 12 when a user of the pneumatic spray gun 10 releases the trigger 45 to stop a spraying operation. Upon sensing a backpressure from the interior volume 13 of the pressure canister 12, the quick exhaust valve 96 can quickly dump the pressure to atmosphere. In certain embodiments, the quick exhaust valve 96 dumps the back pressure in less than 0.1 second, or less than 0.01 second. The quick exhaust valve 96 may thus prevent unwanted discharge of excess texture material M from the dispensing tip D and nozzle insert 27 of the pneumatic gun 10 at the end of a spraying operation.

Figure 18:
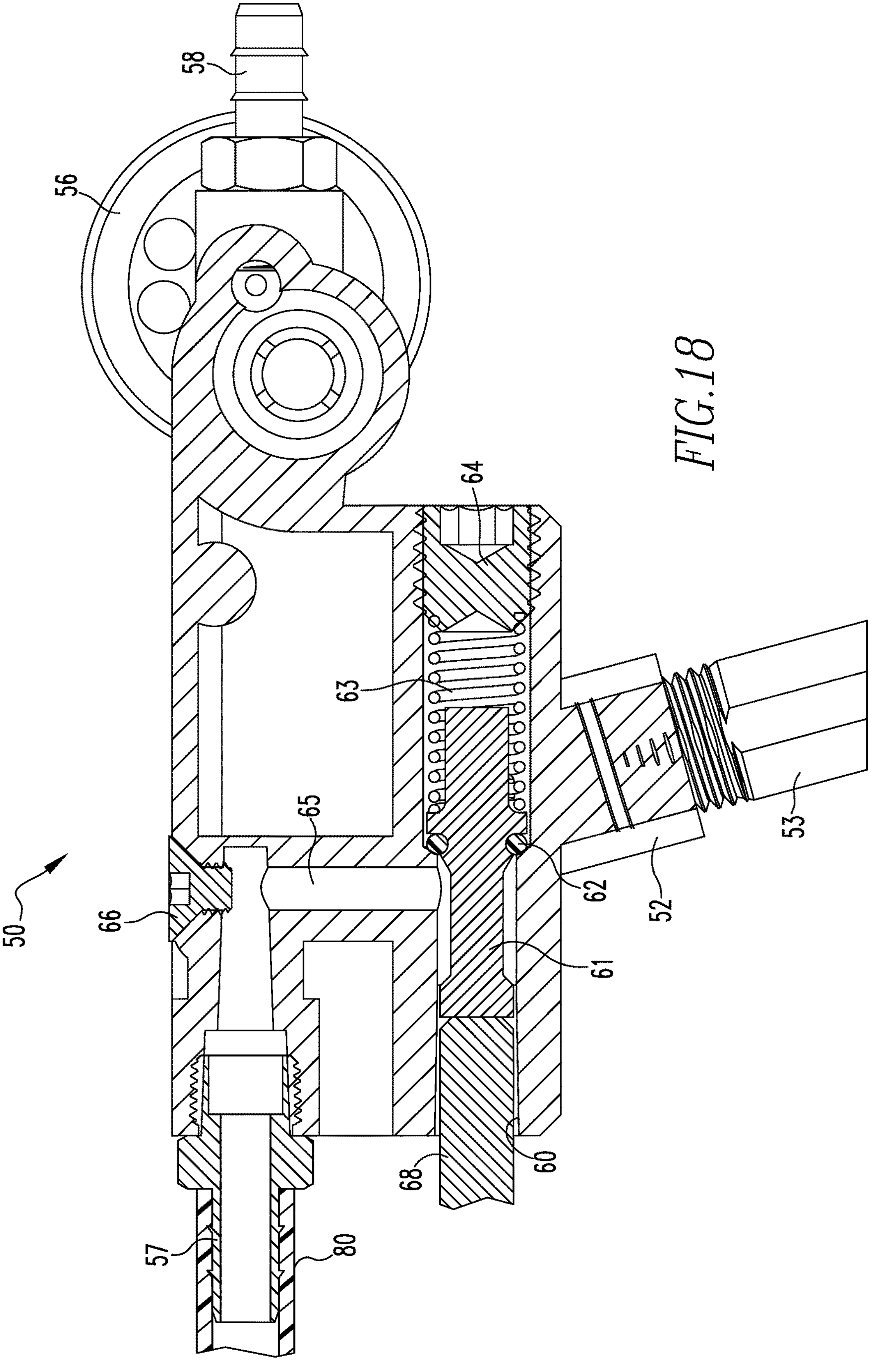
FIG. 18 is a side sectional view taken through section 18-18 of FIG. 16.

As shown in FIGS. 11 and 18, a first pressurized air delivery line 80 is connected to the first pressurized air outlet 57 of the valve assembly 50, and to a nozzle inlet fitting 83 that feeds into the nozzle assembly 20. A pressurized air passage 84 in the nozzle and a nozzle outlet tube 85 are in flow communication with the first pressurized air delivery line 80 through the nozzle inlet fitting 83. An outlet orifice 86 is provided in an air nozzle 87 from which pressurized air from the first pressurized air delivery line 80 impacts texture material M flowing inside the cylindrical sleeve 25 and outside the air nozzle 87. The orifice 86 has an opening diameter that is typically less than the diameter of the nozzle hole 28 of the nozzle insert 27, e.g., at least 25 or 50 percent less. For example, the diameter of the orifice 86 may range from 1 to 3 mm, or from 1.2 to 1.8 mm. The pressurized air from the outlet orifice 86 impacts the texture material M in the nozzle insert 27, thereby forcing the texture material M out through the nozzle hole 28 along with the pressurized air in a desired spray pattern.

As shown in FIG. 11, the front face of the nozzle insert 27 extends an axial nozzle extension distance $N_A$ from the front face of the air nozzle 87. The front face of the air nozzle 87 has a circular outer edge that is located radially inside a conical rear opening of the nozzle insert 27. As shown in FIG. 11, a radial clearance distance $N_R$ is provided between the circular outer edge of the air nozzle 87 front face and the circular inner edge of the rear conical opening of the nozzle insert 27. The axial distance $N_A$ and radial distance $N_R$ may be controlled to provide desired air pressure zones or pressure gradients in the interior region of the nozzle tip 27 during spraying operations, e.g., to avoid unwanted back-pressure on the texture material M as it flows from the dispensing tip D. For example, the ratio of $N_A$:$N_R$ may range from 1:1 to 15:1 or from 1.5:1 to 10:1, or from 2:1 to 5:1. In certain embodiments, the axial distance $N_A$ may range from 1 to 15 mm, or from 2 to 12 mm, or from 3 to 11 mm, and the radial distance $N_R$ may range from 1 to 10 mm, or from 1.5 to 5 mm, or from 2 to 3 mm.

The pressurized air source may comprise any conventional source such as an air compressor, installed pressure line, pressurized air tank, or the like. The air pressure provided from the pressurized air source may typically range from 5 to 90 or 100 psi for example, from 10 to 80 psi or from 25 to 70 psi. The air pressure from the pressurized source may be constant or may be adjustable by the user.

In accordance with embodiments of the present invention, when spraying texture material M such as drywall formulations, the air pressure of the first pressurized air applied to the spray nozzle assembly 20 may typically be 20 psi or greater, and 75 psi or less. For example, the first pressure may range from 30 to 75 psi, or from 40 to 70 psi, or from 40 to 65 psi, or from 50 to 60 psi when spraying textured drywall formulations.

In accordance with embodiments of the present invention, the air pressure of the second pressurized air supplied to the interior volume 13 of the pressure canister 12 is controlled to a level that forces the material M contained in the tube T through the dispensing tip D at a desired flow rate to produce a desired spray pattern. For example, when using the spray gun 10 to spray textured drywall, the second pressure in the interior volume 13 of the canister body 12 may typically be 1 psi or greater, and 50 psi or less. For example, the pressure may range from 1 to 30 or 40 psi, or from 2 to 20 psi, or from 3 to 15 psi.

In accordance with embodiments of the present invention, the pressure regulator 55 or the like may be used to apply a different pressure to the interior volume 13 of the pressure canister 12 than the pressure applied to the nozzle assembly 20. For example, the air pressure of the second pressurized air applied to the interior volume 13 of the pressure canister 12 may be less than the pressure of the first pressurized air applied to the nozzle assembly 20. Typically, the second air pressure applied to the interior volume 13 of the pressure canister 12 may be at least 1 percent less than the first air pressure applied to the nozzle assembly 20, for example, at least 5 percent less, or at least 10 or 20 percent less, or at least 33 percent less, or at least 50 or 70 percent less. In certain embodiments, the pressure of the second pressurized air is from 1 to 99 percent less than the first pressurized air, or from 3 to 70 percent less. In certain embodiments, the pressure of the second pressurized air is from 1 to 99 psi less than the pressure of the first pressurized air, for example, from 2 to 80 psi less, or from 3 to 70 psi less, or from 4 to 50 or 60 psi less, or from 5 to 30 or 40 psi less.

In accordance with embodiments of the present invention, the initiation and termination of the first air spray pressure provided through the first pressurized air delivery line 80, and the second material discharge pressure provided through the second pressurized air delivery line 90 are controlled. In certain embodiments, an initial delay time between flow of the first and second pressurized air streams is at least 0.01 second, for example, from 0.1 to 20 seconds, or from 1 to 5 seconds. In certain embodiments, the ending delay time between stopping of the second and first pressurized air flows is at least 0.05 second, for example, from 0.1 to 5 seconds, or from 1 to 3 seconds. As described above, the initial delay and end delay may be achieved by the differential axial lengths of the first and second actuator plungers 68 and 69. When a user initially squeezes the trigger 45 from its closed position, the first actuator plunger 68 moves the first valve plunger 61 toward its open position, followed by the second valve plunger 69 moving the second valve plunger 71 toward its open position, thereby creating the initial delay time. When a user releases the trigger 45 from its open position, the second valve plunger 71 closes first, followed by closing of the first valve plunger 61, thereby creating the ending delay time.

Figure 20:
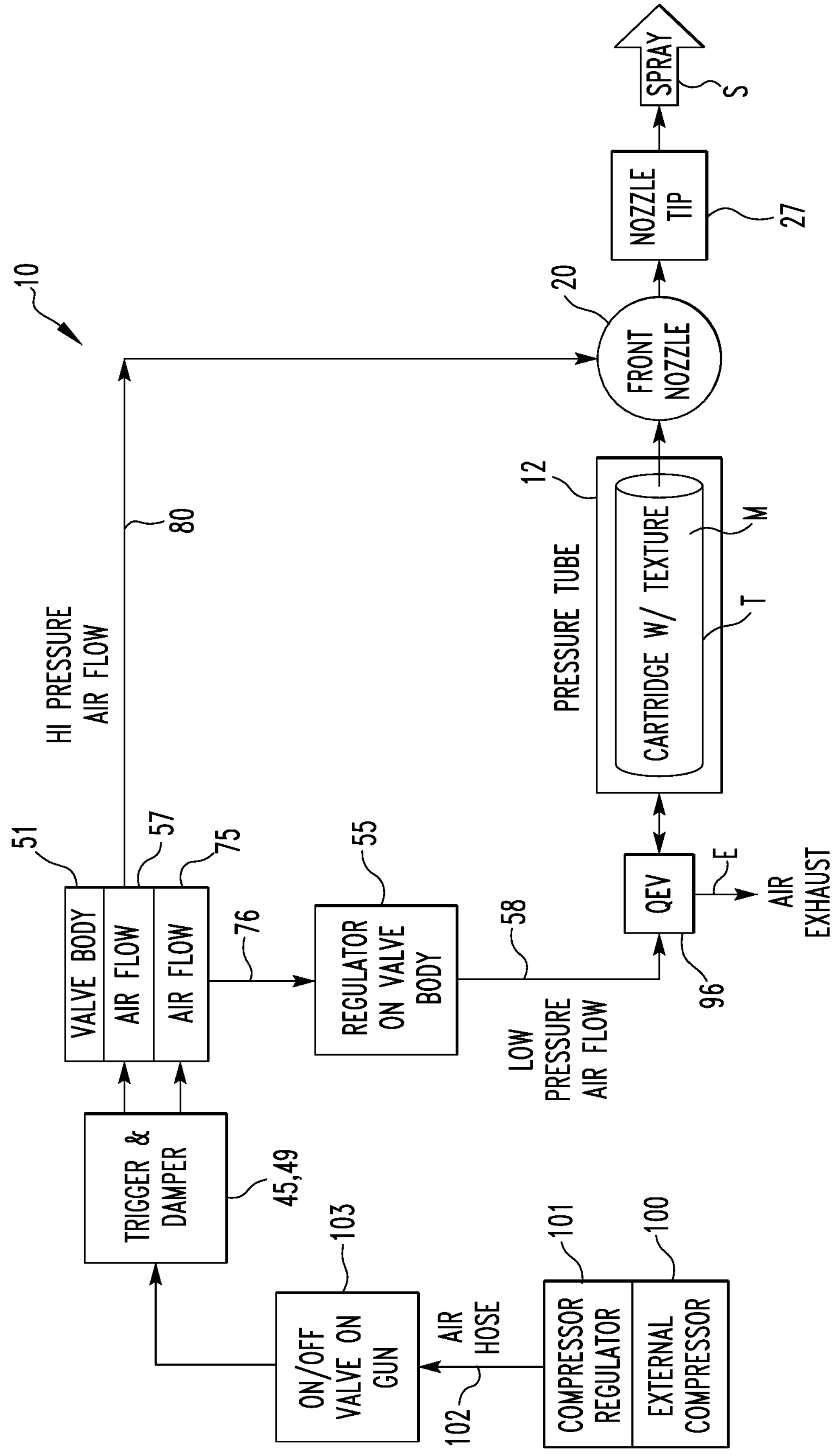
FIG. 20 is a schematic flow diagram illustrating operational features of a pneumatic spray gun in accordance with an embodiment of the present invention.

FIG. 20 schematically illustrates operation of a pneumatic spray gun 10 in accordance with an embodiment of the present invention. As described above, the pneumatic spray gun 10 includes a pressure canister 12 containing a cartridge or tube T of texture material M. The texture material M flows through the front nozzle 20 and nozzle tip 27. The first pressurized air delivery line 80 delivers pressurized air to the front nozzle 20 where it contacts the texture material M as it flows from the pressure tube 12. The combined texture material M and pressurized air are sprayed from the nozzle tip 27 in a spray pattern S.

As further shown in FIG. 20, a pressure source such as an exterior compressor 100 having a compressor regulator 101 feeds pressurized air through an air hose 102. An on/off switch 103 is used to control the flow of pressurized air into the valve body 51 under the control of the trigger 45 and damper assembly 49, as described above. When the trigger 45 is moved from its closed position toward an open position, the first stream of pressurized air initially flows through the front pressurized air outlet 57 for delivery to the front nozzle assembly 20 via the first pressurized air delivery line 80. After a short initial delay time as described above, the second pressurized air flows through the passages 75 and 76 to the pressure regulator 55, where the regulated pressure level may be reduced to a desired level, as described above. The regulated second pressurized air flows through the second pressurized air outlet 58 through the quick exhaust valve 96 and into the interior volume of the pressure canister 12. As further illustrated in FIG. 20, the quick exhaust valve 96 quickly dumps exhaust air E at the end of a spraying operation if backpressure builds up inside the interior volume 13 of the pressure canister 12. When the user releases the trigger 45 from its open position, the first and second biasing springs 63 and 73 act to move the trigger 45 toward its closed position, at which time its lower tip 47 comes into contact with the damper 49 to thereby slow the movement of the trigger 45 and its contact surface 44 as the trigger 45 moves to its closed position.

Figure 21:
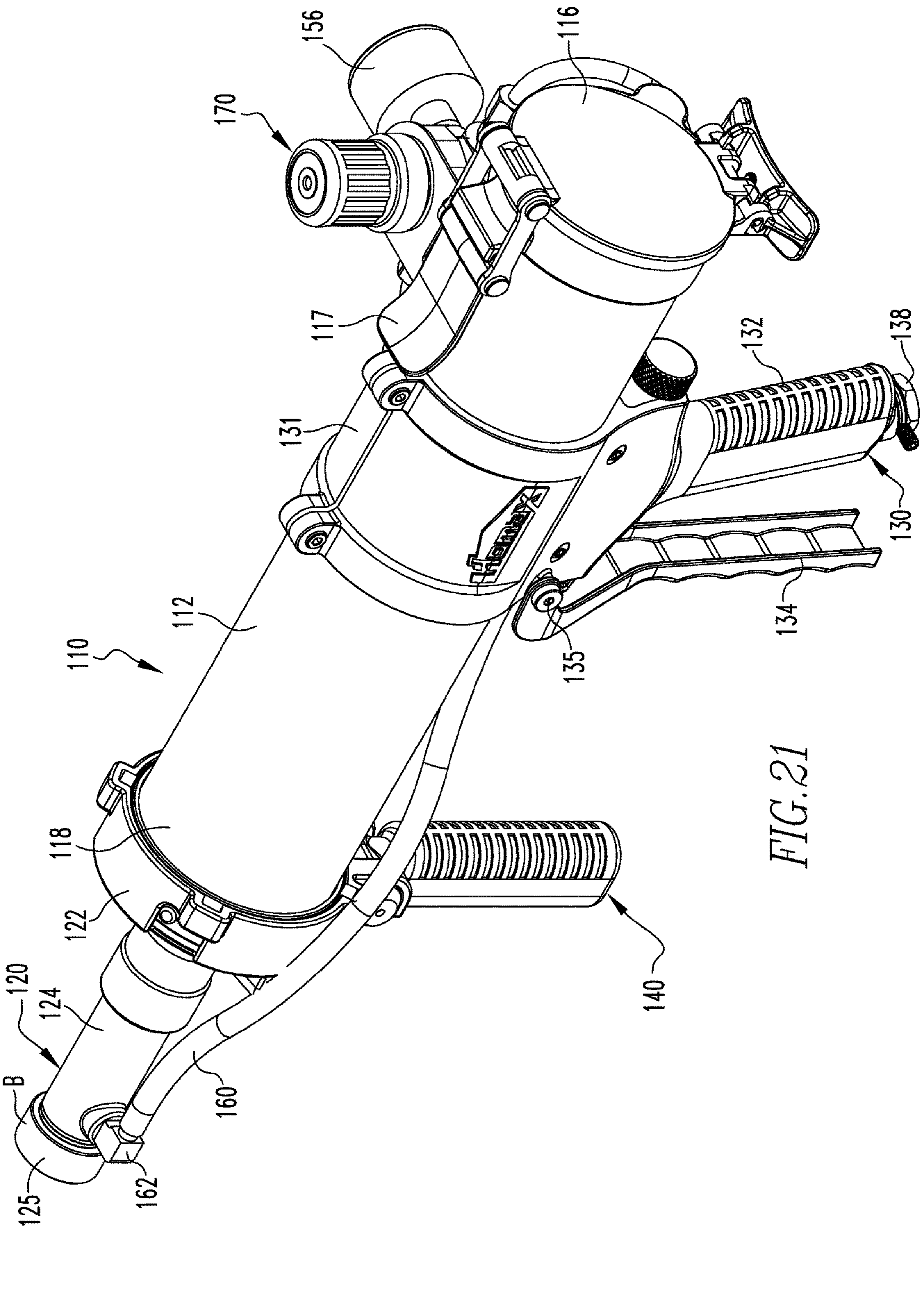
FIG. 21 is a rear isometric view of a pneumatic spray gun in accordance with another embodiment of the present invention.
Figure 22:
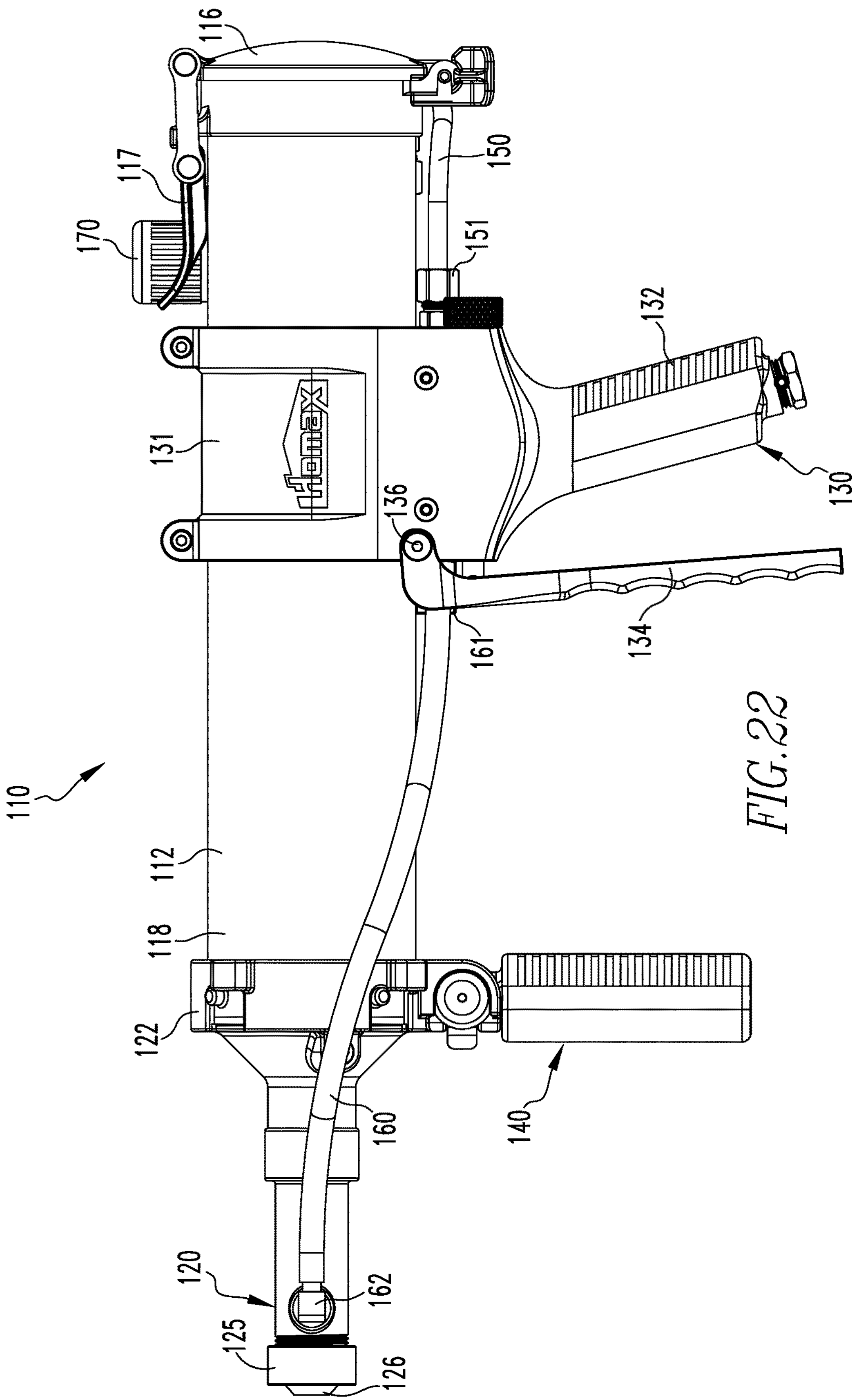
FIG. 22 is a left-side view of the pneumatic spray gun of FIG. 21.
Figure 23:
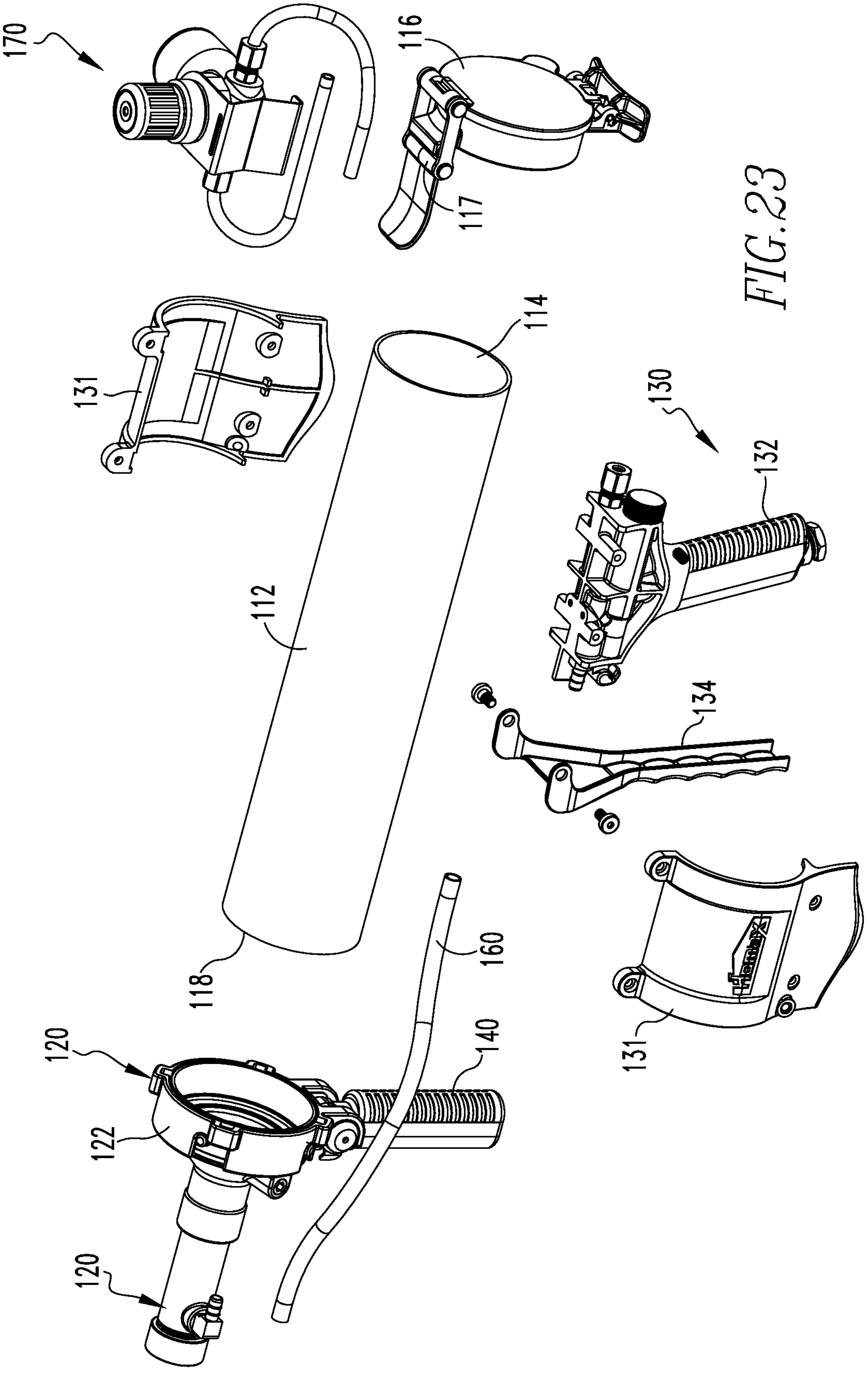
FIG. 23 is an exploded isometric view of the pneumatic spray gun of FIG. 21.

FIGS. 21-23 illustrate a pneumatic spray gun system 110 in accordance with another embodiment of the present invention. The spray gun system 110 includes a pressure canister 112 into which a tube, canister or other type of container for material to be sprayed as described above may be inserted. The pneumatic spray gun system 110 includes a canister body 112 having an interior volume 114. A rear assembly 116 is provided at the back of the canister body 112, which may be sealingly secured to the canister body 112 by a canister latch 117. A discharge end 118 is provided at the front of the canister body 112.

A nozzle assembly 120 is provided at the discharge end 118 of the spray gun 110. The nozzle assembly 120 includes a nozzle collar 122, nozzle body 124, and nozzle discharge end 125 with spray tip 126.

The spray gun 110 also includes a trigger valve assembly 130 including a trigger valve collar 131, valve handle 132, and valve trigger 134. The valve collar 131 and valve handle 132 may be secured together by mechanical fasteners and the like or may be integrally formed. The valve trigger 134 is pivotably mounted on the valve handle 132 by a pivot connection 136. A pressurized air inlet 138 is provided at the bottom of the valve handle 132.

The spray gun 110 also includes a front handle 140 which, in the embodiment shown, is secured to the nozzle collar 122 near the discharge end 118 of the canister body 112, or at any other suitable location. The front handle 140 and valve handle 132 thus provide separate hand-grip locations for two-handed operation of the spray gun 110.

A canister pressure line 150 extends from the trigger valve assembly 130, to pressure regulator assembly 170, and through a pressure regulated line 172 to the rear assembly 116 of the canister body 112 to thereby pressurize the interior volume 114 of the canister body 112. A trigger valve pressure fitting 151 connects the canister pressure line 150 to the trigger valve assembly 130, and a canister pressure fitting connects the canister pressure line 150 to the air inlet side of the pressure regulator 170. The regulated air pressure fitting connects the pressure regulated line 172 to the air exit side of the pressure regulator 170. The canister pressure fitting 152 on the canister body air inlet connects the pressure regulator line 172 to the canister body 112.

A spray nozzle pressure line 160 extends from the trigger valve assembly 130 to the nozzle body 124 of the nozzle assembly 120 to thereby pressurize the interior volume of the nozzle assembly 120. A trigger valve pressure fitting 161 connects the spray nozzle pressure line 160 to the trigger valve assembly 130, and a nozzle pressure fitting 162 connects the spray nozzle pressure line 160 to the nozzle body 124.

A pressure regulator assembly 170 is connected to the canister body 112 by the canister pressure regulated line 172 and operates as follows. When operating, texture material flows from tube out of tube tip into the nozzle body 124, where it merges with the air emerging from the air discharge opening at the anterior end of the spray nozzle pressure tube in the forward region of the nozzle body. The air discharge opening is directed so the pressurized air originating from the spray nozzle pressure line 160 and fitting 162 and flowing through the spray nozzle pressure tube is directed to the nozzle discharge end 126. The air discharge opening is closely located to the spray tip to minimize the air pressure within the nozzle body 124.

The forward portion of the gun includes the portion 124 with the internal spray nozzle pressure tube. The forward portion is advantageous because, in its absence, pressurization of the whole nozzle body 124 with the forward airflow can cause back pressure to impinge upon the texture material flowing from the tube tip. Thus, higher pressure in the front chamber opposing the lower pressure in the posterior region of the canister body and texture could cause the material to not flow to the spray tip. The forward portion allows airflow to emerge close to the back of the spray tip.

Further, the spray tip is tapered, on the receiving side of the airflow, to enable the airflow to funnel through the opening with less turbulence and minimal resistance directing the air and texture material out of the spray tip in the direction of spray from the gun.

A pre-filled tube or cartridge T containing a drywall composition may be loaded into the interior volume of the canister body of the pneumatic spray gun. The tube or canister T may include an extended front tip with an opening at the end thereof. When the drywall tube or canister T is loaded into the spray gun and the rear assembly is secured to the body by the canister latch, the valve trigger may be pressed toward the valve handle to release pressure into the interior volume of the canister body, and into the nozzle assembly. The alternate configuration enables pressurized air to be released and flow to the nozzle assembly when the air source is connected to the gun via the pressure line. Such airflow may be controlled by an air source on/off valve. In such case, a valve trigger may be pressed to release air to the canister body. Such a configuration may contain a separate air source on/off valve located between the pressurized air inlet and the pressure line thereby enabling on/off control over the air pressure directed to the nozzle assembly.

Figure 24:
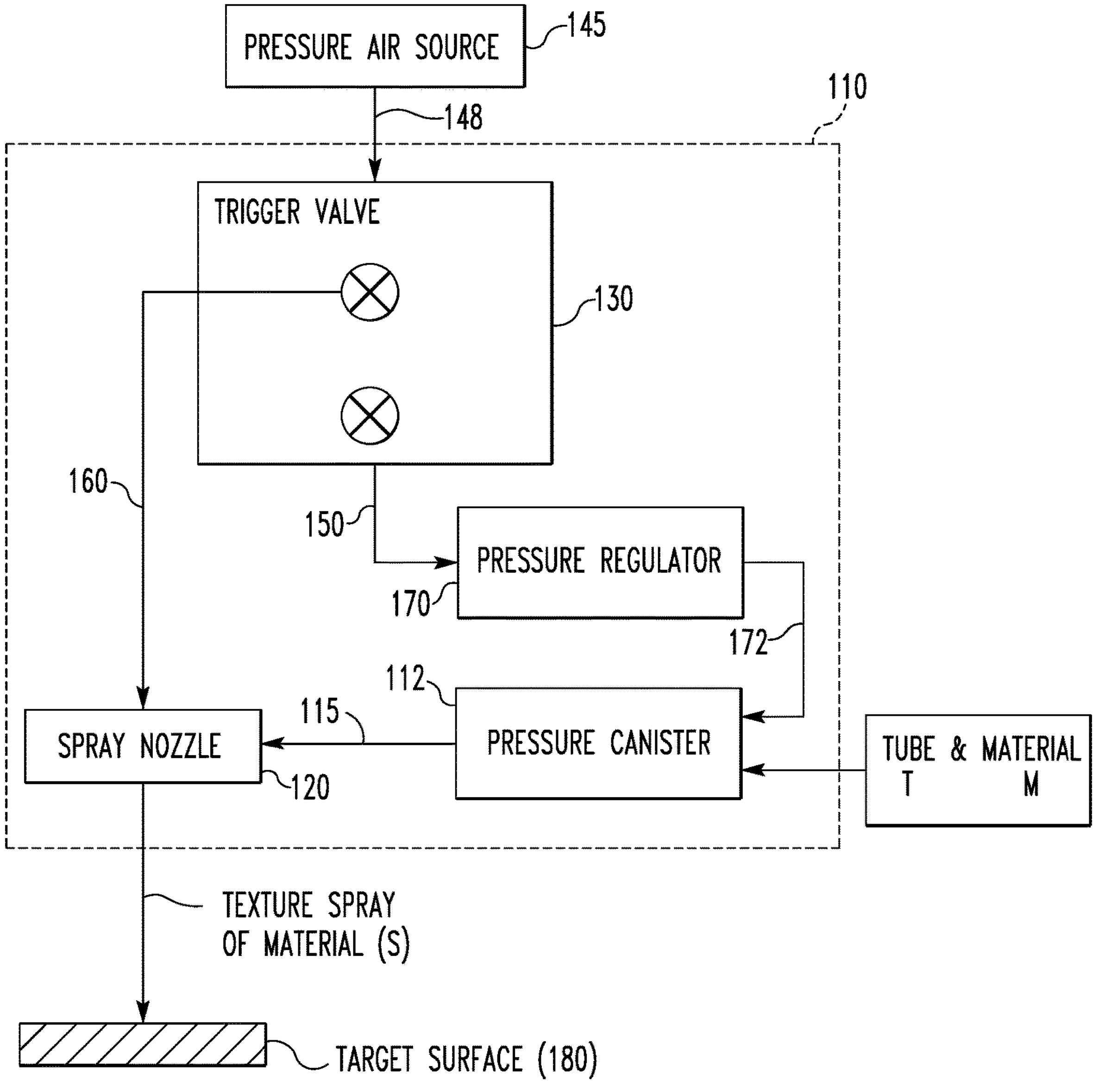
FIG. 24 is a schematic flow diagram illustrating operational features of a pneumatic spray gun in accordance with an embodiment of the present invention.

As shown in the schematic flow diagram of FIG. 24, a pressurized air source 145 may be connected to the pressure canister 112 through a pressure line 148, a trigger valve 130, and a pressure line 150 to a pressure regulator 170 which controls the pressure within the canister 112 via pressure regulated line 172. Texture material is thereby forced to flow 115 from the pressure canister 112 to a spray nozzle 120. The trigger valve 130 is also connected to the spray nozzle 120 of the spray gun assembly by pressure line 160. Alternatively, the pressure regulator 170 connected by pressure line 150 from trigger valve 130 to pressure canister 112 by canister pressure regulated line 172 may be configured so pressure canister 112 may be equipped with a set or variable pressure regulating pressure release valve that acts as a pressure regulating device controlling pressure in canister 112, instead of pressure regulator 170. The pressurized air source 145 is connected via the trigger valve 130 to both the pressure canister 112 and the spray nozzle 120. A desired spray pattern S is projected from the spray nozzle 120 to a target surface 180.

Figure 25:
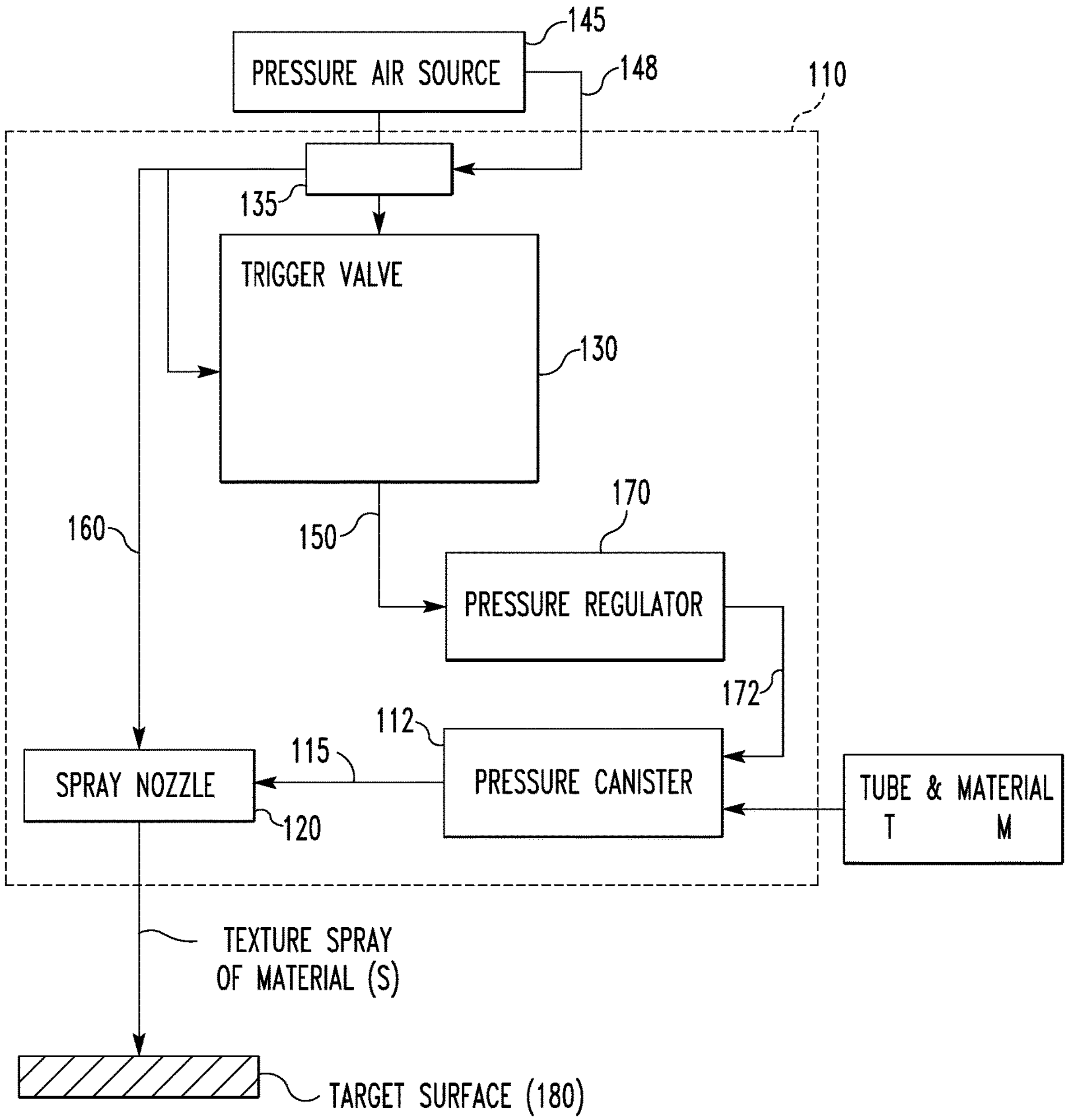
FIG. 25 is a schematic flow diagram illustrating operational features of a pneumatic spray gun in accordance with another embodiment of the present invention.

As shown in the schematic flow diagram of FIG. 25, another configuration of the present invention is to have the pressurized air source 145 connected to the spray nozzle 120, and an air source on/off valve 135 may be employed to control airflow from pressure line 148 to the spray nozzle 120. The pressurized air source 145 is connected to the pressure canister 112 through pressure line 148, valve 135 and trigger valve 130, and through pressure line 150 to the pressure regulator 170 which controls pressure within the canister 112 through a canister pressure regulated line 172. Texture material is thereby forced to flow 115 from the pressure canister 112 to a spray nozzle 120. A desired spray pattern S is projected from the spray nozzle 120 to a target surface 180.

For purposes of the description above, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A pneumatic spray gun for spraying texture material, the pneumatic spray gun comprising:

a pressure canister having a central longitudinal axis and an interior volume structured and arranged to receive a tube of the texture material and to pressurize the texture material;

a nozzle assembly adjacent to a front end of the pressure canister comprising:

a spray nozzle structured and arranged to discharge the pressurized texture material therethrough comprising a sleeve having a rear opening aligned along the central longitudinal axis structured and arranged to receive the pressurized texture material therethrough, and a nozzle insert having a central hole and a front face; and an air nozzle surrounded by the spray nozzle sleeve and comprising a central outlet orifice and a front face structured and arranged to direct first pressurized air toward the pressurized texture material as it passes radially outside of the central outlet orifice and through the spray nozzle, wherein the front face of the nozzle insert is located axially forward of the front face of the air nozzle an axial nozzle extension distance $N_A$ and the central outlet orifice is located axially inside the nozzle insert and is structured and arranged to inject the pressurized air into the pressurized texture material upstream from the central hole and front face of the nozzle insert;

a valve assembly structured and arranged to selectively direct the first pressurized air through the air nozzle, and to selectively direct second pressurized air to the interior volume of the pressure canister to force the pressurized texture material from the tube toward the spray nozzle for contact with the first pressurized air; and a trigger engaged with the valve assembly to actuate the valve assembly to thereby control flow of the first pressurized air to the air nozzle or to control flow of the second pressurized air to the interior volume of the pressure canister.

2. The pneumatic spray gun of claim 1, wherein the valve assembly controls the flow of the first pressurized air and controls the flow of the second pressurized air.

3. The pneumatic spray gun of claim 2, wherein the valve assembly comprises:

a pressurized air inlet;

a first pressurized air outlet in flow communication with the air nozzle; and a second pressurized air outlet in flow communication with the interior volume of the pressure canister.

4. The pneumatic spray gun of claim 3, further comprising a pressure regulator in flow communication with the second pressurized air outlet.

5. The pneumatic spray gun of claim 4, wherein the pressure regulator decreases pressure of the second pressurized air delivered to the interior volume of the pressure canister below pressure of the first pressurized air delivered from the valve assembly through the first pressurized air outlet.

6. The pneumatic spray gun of claim 5, wherein the pressure of the second pressurized air is at least 1 percent less than the pressure of the first pressurized air.

7. The pneumatic spray gun of claim 5, wherein the pressure of the second pressurized air is from 10 to 99 percent less than the pressure of the first pressurized air.

8. The pneumatic spray gun of claim 5, wherein the pressure of the second pressurized air is from 1 to 99 psi less than the pressure of the first pressurized air.

9. The pneumatic spray gun of claim 5, wherein the pressure of the second pressurized air is from 3 to 70 psi less than the pressure of the first pressurized air.

10. The pneumatic spray gun of claim 3, wherein movement of the trigger from a closed position toward an open position causes the first pressurized air to flow from the first pressurized air outlet of the valve assembly and causes the second pressurized air to flow from the second pressurized air outlet of the valve assembly after an initial delay time.

11. The pneumatic spray gun of claim 10, wherein the initial delay time is at least 0.01 second.

12. The pneumatic spray gun of claim 10, wherein the initial delay time is from 0.1 to 10 seconds.

13. The pneumatic spray gun of claim 10, wherein movement of the trigger from the open position toward the closed position causes the flow of the second pressurized air from the second pressurized air outlet to stop and causes the flow of the first pressurized air from the first pressurized air outlet to stop after an ending delay time.

14. The pneumatic spray gun of claim 3, wherein movement of the trigger from an open position toward a closed position causes flow of the second pressurized air from the second pressurized air outlet of the valve assembly to stop and causes flow of the first pressurized air from the first pressurized air outlet of the valve assembly to stop after an ending delay time.

15. The pneumatic spray gun of claim 14, wherein the ending delay time is at least 0.05 second.

16. The pneumatic spray gun of claim 14, wherein the ending delay time is from 0.1 to 10 seconds.

17. The pneumatic spray gun of claim 3, further comprising a quick exhaust valve in flow communication with the second pressurized air outlet of the valve assembly and the interior volume of the pressure canister which senses back pressure from the interior volume of the pressure canister when the trigger is moved toward a closed position, and exhausts the back pressure to atmosphere in less than 0.1 second.

18. The pneumatic spray gun of claim 1, further comprising a valve actuator assembly in contact with a contact surface of the trigger, the valve actuator assembly comprising a first actuator plunger slidingly insertable in a first valve cylinder of the valve assembly, and a second actuator plunger slidingly insertable in a second valve cylinder of the valve assembly.

19. The pneumatic spray gun of claim 18, wherein the first actuator plunger is biased against the contact surface of the trigger by a first spring-biased valve plunger contained in the first valve cylinder, the second actuator plunger is biased against the contact surface of the trigger by a second spring-biased valve plunger contained in the second valve cylinder, and a lower trigger tip of the trigger contacts a damper piston to provide resistance to movement of the trigger toward a closed position.

20. The pneumatic spray gun of claim 1, wherein the axial nozzle extension distance $N_A$ is from 1 to 15 mm.

21. A method of spraying texture material from a pneumatic spray gun as recited in claim 1, the method comprising:

loading a tube of flowable texture material into the pneumatic spray gun; and moving the trigger of the pneumatic spray gun from a closed position toward an open position to thereby initiate flow of the first pressurized air followed by flow of the second pressurized air after an initial delay time.

* * * * *